(12) United States Patent
Shakiba et al.

(10) Patent No.: US 8,159,927 B2
(45) Date of Patent: Apr. 17, 2012

(54) TRANSMIT, RECEIVE, AND CROSS-TALK CANCELLATION FILTERS FOR BACK CHANNELLING

(75) Inventors: Mohammad Hossein Shakiba, Richmond Hill (CA); John Hudson, Burlington (CA); Jack MacDougall, Burlington (CA); Martin Rofheart, Falls Church, VA (US); David L. Lynch, Burlington (CA)

(73) Assignee: Gennum Corporation (CA)

( * ) Notice: Subject to any disclaimer, the term of this patent is extended or adjusted under 35 U.S.C. 154(b) by 173 days.

(21) Appl. No.: 12/484,443

(22) Filed: Jun. 15, 2009

(65) Prior Publication Data

US 2010/0043045 A1  Feb. 18, 2010

Related U.S. Application Data

(63) Continuation-in-part of application No. 12/029,053, filed on Feb. 11, 2008.

(60) Provisional application No. 60/901,777, filed on Feb. 16, 2007, provisional application No. 60/939,403, filed on May 22, 2007, provisional application No. 60/956,394, filed on Aug. 17, 2007.

(51) Int. Cl.
*H04J 1/12* (2006.01)
(52) U.S. Cl. ........ 370/201; 370/351; 370/389; 370/419; 370/466
(58) Field of Classification Search .................. 370/201, 370/351, 389, 419, 466
See application file for complete search history.

(56) References Cited

U.S. PATENT DOCUMENTS

| 7,408,993 B2 * | 8/2008 | Webster ........................ 375/257 |
| 7,536,017 B2 | 5/2009 | Sakurai et al. |
| 7,583,797 B2 * | 9/2009 | Rahamim et al. ........ 379/399.01 |
| 2004/0114939 A1 * | 6/2004 | Taylor ............................ 398/152 |
| 2005/0069130 A1 | 3/2005 | Kobayashi |
| 2006/0077778 A1 | 4/2006 | Tatum et al. |

(Continued)

FOREIGN PATENT DOCUMENTS

| CA | 2621256 A1 | 8/2008 |
| CN | 1581717 A | 2/2005 |

OTHER PUBLICATIONS

Office Action issued by the Chinese Patent Office for Application Serial No. 200810127738.9, dated Dec. 3, 2010, 17 pages.

(Continued)

*Primary Examiner* — Luat Phung
(74) *Attorney, Agent, or Firm* — Jones Day

(57) ABSTRACT

Systems and methods are provided herein for interfacing a first digital device with a second digital device. An exemplary method includes the steps of combining one of a plurality of digital content channels and a back channel to form a composite channel, the back channel for transmitting information from the second multi-media digital device to the first multi-media digital device, converting a digital content channel and the composite channel from the first digital device into a plurality of single-ended digital content channels, transporting the plurality of single-ended digital content channels from the first digital device to the second digital device, and converting the single-ended digital content channels back into the digital content channel and the composite channel that are supplied to the second digital device. Cross-talk interference is reduced between the back channel and one of the plurality of digital content channels via a cross-talk cancellation filter.

55 Claims, 32 Drawing Sheets

U.S. PATENT DOCUMENTS

2007/0263713 A1 11/2007 Aronson
2008/0013725 A1 1/2008 Kobayashi
2008/0069191 A1* 3/2008 Dong et al. .................. 375/219
2011/0053522 A1* 3/2011 Rofougaran et al. ........... 455/73

OTHER PUBLICATIONS

PCT/CA2010/000903, Notification of Transmittal of the International Search Report and the Written Opinion of the International Search Authority, dated Oct. 19, 2010, 9 pages.

Extended European Search Report dated Oct. 5, 2011 for European Patent Application No. 08002881.4.

Hashemi, H. "Differential-to-Single-Ended Converter", EDN Electrical Design News, Mar. 14, 2006, p. 96.

Hudson et al., "3G: The Evolution of the Serial Digital Interface (SDI)", SMPTE Motion Imaging Journal, Nov./Dec. 2006, pp. 472-481.

Michel et al., "A Novel Method to Linearise Phase Response of Single-Ended to Differential Converters for High Bit Rates", 2004 IEEE MTT-S Digest, pp. 1193-1196.

* cited by examiner

Fig. 1 "Prior Art"

|  |  | HIGH-PASS | FIRST BAND-PASS | SECOND BAND-PASS | LOW-PASS |
|---|---|---|---|---|---|
| HDMI OVER 5 CABLE BUNDLE | CABLE 1 | DATA2 | — | — | CEC |
|  | CABLE 2 | DATA1 | — | — | SCL |
|  | CABLE 3 | DATA0 | — | — | SDA |
|  | CABLE 4 | CLOCK | — | — | HPD |
|  | CABLE 5 | POWER ||||
| DISPLAYPORT OVER 4 CABLE BUNDLE | CABLE 1 | Lane0 | — | — | CEC |
|  | CABLE 2 | Lane1 | — | — | AUX |
|  | CABLE 3 | Lane2 | — | — | HPD |
|  | CABLE 4 | Lane3 | — | — | POWER |
| DISPLAYPORT OVER SINGLE CABLE WITHOUT POWER | CABLE 1 | Lane 0 | AUX | — | HPD |
| DISPLAYPORT OVER SINGLE CABLE WITH POWER | CABLE 1 | Lane 0 | AUX | HPD | POWER |

Fig. 10

|  |  | HIGH-PASS | FIRST BAND-PASS | SECOND BAND-PASS | LOW-PASS |
|---|---|---|---|---|---|
| HDMI OVER 5 CABLE BUNDLE | CABLE 1 | 5MHz | — | — | 200KHz |
|  | CABLE 2 | 5MHz | — | — | 200KHz |
|  | CABLE 3 | 5MHz | — | — | 200KHz |
|  | CABLE 4 | 5MHz | — | — | 200KHz |
|  | CABLE 5 | POWER ||||
| DISPLAYPORT OVER 4 CABLE BUNDLE | CABLE 1 | 10MHz | — | — | 4KHz |
|  | CABLE 2 | 10MHz | — | — | 5MHz |
|  | CABLE 3 | 10MHz | — | — | 4KHz |
|  | CABLE 4 | 10MHz | — | — | 2KHz |
| DISPLAYPORT OVER SINGLE CABLE WITHOUT POWER | CABLE 1 | 10MHz | 20KHz-5MHz | — | 2KHz |
| DISPLAYPORT OVER SINGLE CABLE WITH POWER | CABLE 1 | 10MHz | 20KHz-5MHz | 200Hz-2KHz | 100Hz |

Fig. 11

TRANSMIT, RECEIVE, AND CROSS-TALK CANCELLATION FILTERS FOR BACK CHANNELLING

CROSS-REFERENCE TO RELATED APPLICATIONS

This application is a continuation-in-part of U.S. patent application Ser. No. 12/029,053, entitled "Multi-media Digital Interface Systems and Methods," filed on Feb. 11, 2008, which claims priority from the following U.S. Provisional Applications: (1) U.S. 60/901,777, titled "Multi-Media Digital Interface over a Single Link," filed on Feb. 16, 2007; (2) U.S. 60/939,403, titled "Alternate Physical Interface for Multi-Media Digital Interconnect," filed on May 22, 2007; and (3) U.S. 60/956,394, titled "Link Reduction of Digital Multi-Media Interfaces Using Hybrid Frequency Multiplexing," filed on Aug. 17, 2007. Each of these prior applications are incorporated by reference into this patent application as if fully set forth herein.

BACKGROUND

As multi-media displays and audio/video processing devices increasingly transition to higher performance technologies that support more functionalities and features, the problem of interfacing becomes more complex. The challenge is to establish reliable communications with a minimum number of channels that meet the performance and cost objectives of the application. Known interface technologies, such as VGA, component video, DVI, HDMI, DisplayPort, and SDI provide several examples of current multi-media interconnect technology. These known technologies, however, suffer from several limitations.

For example, VGA is limited in its ability to scale to support higher resolutions and color depths, and it does not have a means available to protect high definition content for consumer use. In addition, VGA does not provide native multi-media connectivity, being limited to video and graphics with limited control via the Display Data Channel (DDC) interface. The VGA connector and cabling is also physically very large, difficult to route, and relatively expensive.

Analog component video, like VGA, suffers from similar scalability issues and lack of true multi-media support, although there is a defined means (Macro Vision™) to protect content for consumer use. The Macro Vision™ technique, however, provides only a limited level of protection. The component connectors and cabling provide probably the best performance of all existing interfaces in terms of cost, routability, and signal integrity. In addition, like VGA, long cable runs of many 10's of meters are possible with component video before any noticeable signal loss becomes apparent.

DVI technology is limited in that the DVI 1.0 specification is in essence frozen and cannot be easily updated to support higher clock speeds, color depths, connector types, or new features. Although DVI does provide optional content protection, there is no support for audio. DVI connectors and cabling are also physically very large and difficult to route, and the cable length is extremely limited and is very expensive. Moreover, interoperability issues have plagued this interface, which has contributed to the relatively low adoption rate for DVI, even in the target application of PC to monitor interfaces. Another limitation of DVI is that the physical interface requires a 3.3V supply and the signaling is DC-coupled into the interface media. This severely restricts technology migration into low-voltage silicon applications that will be found in future PCs and other multi-media applications.

HDMI is well-suited for its application to TVs, but falls short for broad cross-industry application support due to limitations in terms of performance scalability. HDMI also suffers from being a closed and proprietary standard with stringent compliance testing and licensing issues. Although HDMI does provide true multi-media support and optional content protection, being a super-set of DVI it exhibits similar operational constraints. Like DVI, HDMI cable is bulky and exceedingly expensive, although the HDMI connector design is substantially smaller than the DVI connector. HDMI cable lengths are typically restricted and interoperability issues with the interface are very common.

DisplayPort provides an open, extensible, and scalable multi-media digital interface targeted as a replacement for existing interfaces in PC-to-display and inside-the-box applications. It is, however, focused mainly on PC-to-display connectivity, much as HDMI is focused on consumer electronics multi-media applications. DisplayPort also suffers from limited cable length with a typical three meters for full bandwidth support. Although limited interoperability tests have been carried out, wide-scale deployment of DisplayPort will be required to prove or disprove the technology claims of robustness. Connector and cabling costs and performance are therefore unknown at this time.

The SDI interface has enjoyed over 20 years of development, evolution, and continuous interoperability testing in professional applications. This open standard interface provides multi-media connectivity over a coaxial cable connection that does not suffer from the cable length limitations, routability, interoperability, or high connectivity costs of the other digital interfaces described herein. The almost exclusive use of SDI in professional applications does, however, mean that the need for content protection and bi-directional command and control information has not as of yet been addressed in the interface.

Among the aforementioned standards, only SDI operates on a single coaxial copper link. The DVI, HDMI, and DisplayPort interfaces all employ bundles of different cables, typically comprising several twisted pairs accompanied by additional single wires, all enclosed in an outer insulator layer. The electrical and physical characteristics of these interfaces have led to performance disadvantages in achieving cable lengths even far shorter than that of SDI.

The electrical characteristics and physical media for DVI, HDMI and DisplayPort utilize low voltage differential signaling (e.g., transition minimized differential signaling or TMDS) over multiple twisted pair copper cables. As the data rate requirements for these interfaces extend into the multiple Gb/s range, the limitations of the signaling and twisted pair copper cable media have an increasingly detrimental effect on cable reach and reliability of operation. These limitations are due to two major sources of signal degradation: (1) attenuation; and (2) intra-pair skew.

The loss characteristic 10 of a typical cable used in HDMI, DVI, or DisplayPort applications is shown in FIG. 1. In this figure, four different lengths of cable (2.5 m, 5 m, 10 m and 20 m) are described, and the attenuation loss of the cable, measured in dB, is plotted as a function of frequency. Also shown in this figure as dashed vertical lines, are the frequencies of most interest in current HDTV standard implementations, including 720p/1080i, 1080p and 1080p Deep Color. As shown in this figure, as the cable lengths extend beyond 5 m, losses become substantial.

In addition to losses caused by attenuation in the cable, signal loss in the HDMI, DVI, or DisplayPort interface technologies can also be attributed to the effects of intra-pair skew. FIG. 2, for example, illustrates cable attenuation as a function of intra-pair skew for a typical cable. It should be noted that this loss is not included in the diagram of FIG. 1 and at higher data rates, significant additional attenuation is added to the losses illustrated therein.

The application of transmitter pre-emphasis and/or receiver cable equalization is widely deployed to improve performance of these interfaces, and at data rates greater than about 1.5 Gb/s per signaling lane, application of these technologies is instrumental. This rate is significant as it represents the transmission of full high-definition video (1920× 1080p60 RGB 444 10-bit). By utilizing pre-emphasis and/or receiver equalization, reliable operation at this rate can typically be achieved for cable lengths in the range of about 5 to 10 meters. Improvements in cable manufacturing technologies and the use of thick (24 AWG) twisted pair cables with multiple layers of shielding can further improve connectivity by reducing signal attenuation and controlling intra-pair skew. Using these additional techniques, cable lengths of up to 15 meters can be achieved for full HD transmission, but these cables are very expensive and generally very bulky and difficult to install and manage.

In multi-media interfaces, such as described herein, there are typically other lower rate auxiliary, configuration and/or control channels in addition to the higher rate digital content channels that may be transmitted between the source and the sink. Link and device management signals fall under this category. In the existing interfaces, often this information is of a bi-directional nature where the receiver and the transmitter time-share a dedicated link for this purpose. The DDC link in the DVI and HDMI interfaces and the auxiliary channel in the DisplayPort interface are examples that require bi-directional communication. These lower rate links are referred to herein, generally, as auxiliary channels. In addition to the bi-directional links, there may be a need for very slow and unidirectional communication as well. The hot plug detect signal is an example of such links in the DVI, HDMI, and DisplayPort interfaces. These types of links are referred to herein as status channels. In addition, a power link may be provided that offers one end (usually the receiver) with the required supply current provided by the other end (usually the transmitter). This calls for a DC supply connection (hereinafter, a supply channel) between the two sides of the link.

SUMMARY

Systems and methods are provided herein for interfacing a first multi-media digital device with a second multi-media digital device. An exemplary method includes the steps of: (i) converting a plurality of differential digital content channels from the first multi-media digital device into a plurality of single-ended digital content channels; (ii) transmitting the plurality of single-ended digital content channels from the first multi-media digital device to the second multi-media digital device via one or more coaxial cables; and (iii) receiving the single-ended digital content channels from the one or more coaxial cables and converting the single-ended digital content channels back into a plurality of differential digital content channels that are supplied to the second multi-media digital device. Additional steps of the exemplary method may include: (i) transmitting one or more auxiliary channels between the first multi-media digital device and the second multi-media digital device; and (ii) combining the one or more auxiliary channels with at least one of the plurality of digital content channels to form a combined channel to be transmitted from the first multi-media digital device to the second multi-media digital device.

Another exemplary method disclosed herein comprises the step of transmitting the plurality of single-ended digital content channels from the first multi-media digital device to the second multi-media digital device via a plurality of coaxial cables. Still another exemplary method disclosed herein comprises the steps of: (i) frequency multiplexing at least one of the single-ended digital content channels with one or more auxiliary channels to form a combined signal; and (ii) transmitting the combined signal to the second multi-media digital device over at least one of the one or more coaxial cables. The aforementioned frequency multiplexing steps may be carried out using a pair of filter hybrids for each of the plurality of single-ended digital content channels, where a first filter hybrid is associated with the first multi-media digital device and a second filter hybrid is associated with the second multi-media digital device. Using these exemplary filter hybrids, a plurality of combined signals may be generated which may comprise one of the single-ended digital content channels and an auxiliary channel.

As another example, an interface system for coupling a first digital device with a second digital device may include circuitry for combining a high frequency digital content channel for transmitting digital content from the first digital device to the second digital device and a low frequency back channel for transmitting information from the second digital device to the first digital device to form a composite channel and a cable for transporting the combined channel. The system may also include a cross-talk cancellation filter configured to reduce cross-talk interference between the back channel and the digital content channel. The system may also include a back channel transmit filter configured to filter the back channel, where the back channel transmit filter is coupled between the cable and the second digital device. The system may also include a back channel receive filter configured to filter the back channel, the back channel receive filter being coupled between the first digital device and the cable. The system may also include a main channel transmit filter configured to filter the digital content channel, the main channel transmit filter being coupled between the first digital device and the cable. The system may also include a main channel receive filter configured to filter the digital content channel, the main channel receive filter being coupled between the cable and the second digital device.

As an additional example, an interface system for coupling a first digital device with a second digital device may include circuitry for combining one of a plurality of digital content channels and a back channel to form a composite channel, the back channel including a configuration and control channel for transmitting information from the second digital device to the first digital device. The system may also include a plurality of differential to single-ended converters that convert a digital content channel and the composite channel from the first digital device into a plurality of single-ended channels. One or more coaxial cables may transport the plurality of single-ended channels from the first digital device to the second digital device. A plurality of single-ended to differential converters may convert the single-ended channels from the one or more coaxial cables back into the differential digital content channel and the composite channel that are supplied to the second digital device, and a cross-talk cancellation filter may be configured to reduce cross-talk interference between the back channel and one of the plurality of digital content channels.

As an additional example, only one of the first or second digital devices may utilize a single ended channel. In such a configuration, only one of the differential to single-ended converters or single-ended to differential converters may be used.

As a further example, a method of interfacing a first digital device with a second digital device may include combining one of a plurality of digital content channels and a back channel to form a composite channel, the back channel for transmitting information from the second digital device to the first digital device. The method may also include converting a digital content channel and the composite channel from the first digital device from differential channels into a plurality of single-ended digital content channels. The plurality of single-ended digital content channels may be transported from the first digital device to the second digital device and may be converted back into the differential digital content channel and composite channel that are supplied to the second digital device. Cross-talk interference between the back channel and one of the plurality of digital content channels may be reduced via a cross-talk cancellation filter.

BRIEF DESCRIPTION OF THE DRAWINGS

FIG. 10 is an example channel-to-spectrum mapping table for the example interfaces shown in FIGS. 8 and 9;

FIG. 11 is an example cut-off frequency table for the example interfaces shown in FIGS. 8 and 9;

DETAILED DESCRIPTION

Figure 3:
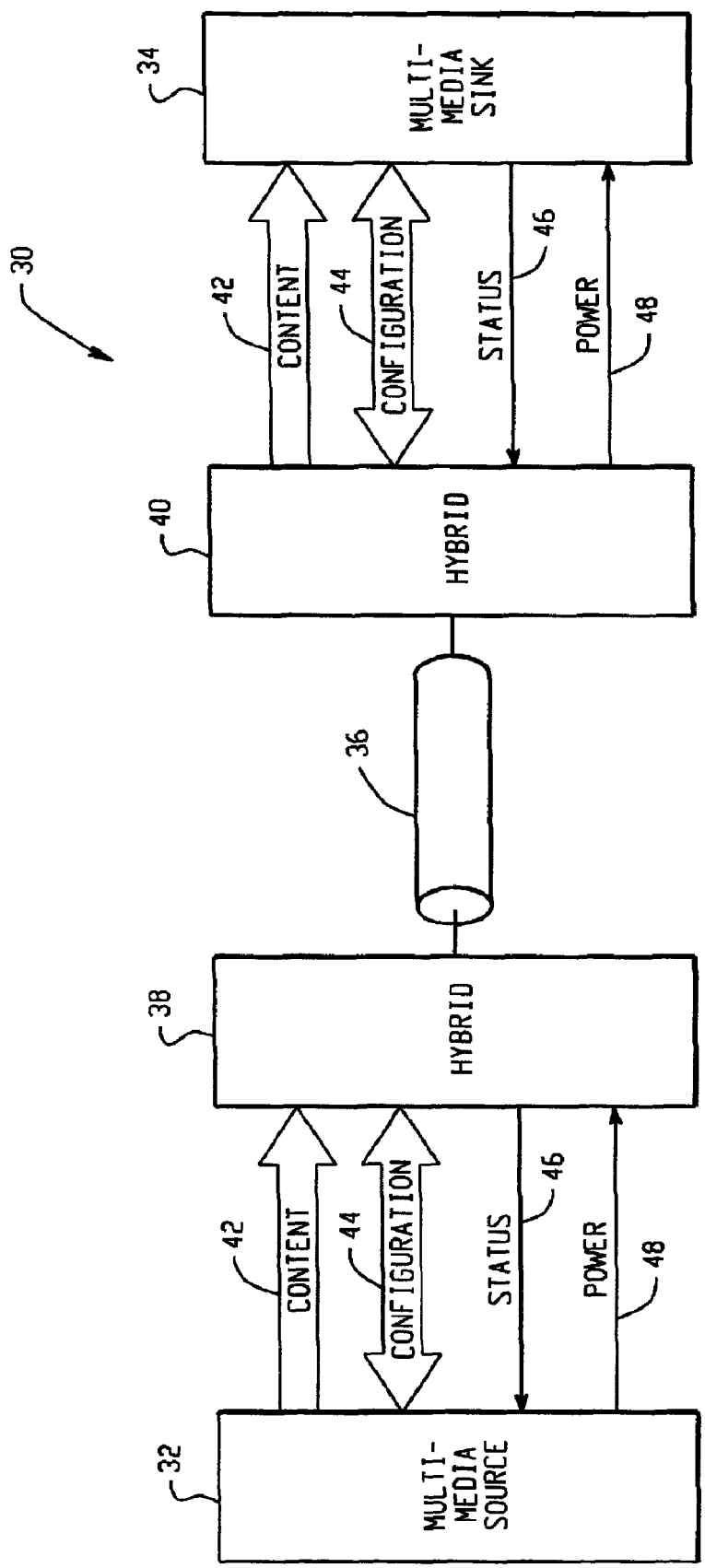
FIG. 3 is a block diagram of an example multi-media digital interface system for transporting digital content and configuration data over a single media.

Turning now to the remaining drawing figures, FIG. 3 is a block diagram of an example multi-media digital interface system 30 for transporting digital content and configuration data over a single media. The interface system of FIG. 3 includes a pair of hybrid circuits 38, 40, which are coupled between a first multi-media digital device 32 and a second multi-media digital device 34. In this figure, the first multi-media digital device 32 is a multi-media source and the second multi-media digital device 34 is a multi-media sink. For example, the multi-media source 32 may be a high-definition video disk player and the multi-media sink 34 may be a high-definition television display. The hybrid circuits 38, 40 are, in turn, coupled to one another via a single media 36, which may be a coaxial cable.

The multi-media source device 32 generates one or more differential digital content channels 42, which may be, for example, transition-minimized differential signals (TMDS), such as are generated from an HDMI or DisplayPort source interface. In addition, the source device may generate one or more auxiliary channels, such as configuration channel 44 and power channel 48. Although not shown in FIG. 3, the source device 32 may also generate a clock channel, which is typically a high frequency channel carrying timing data related to the multi-media data in the one or more digital content channels 42. Thus, the clock channel is a form of digital content channel.

The configuration channel may be any type of data channel which is used to transport configuration and/or control information between the first and second multi-media digital devices. For example, the Display Data Channel (DDC) and Consumer Electronics Channel (CEC) are examples of this type of configuration channel 44. The configuration channel 44 can be unidirectional or bidirectional, depending on the implementation of the interface system.

The status channel is typically implemented as a unidirectional channel, although it is possible that this too could be a bidirectional link. As an example, unidirectional status channels may be used to carry hot-plug detect information from the second multi-media digital device 34 to the first multi-media digital device 32 or may be used, for example, to transport enhanced display identification data (EDID). The power channel is typically utilized to provide DC power to the circuitry in the first and second hybrid circuits 38, 40.

The hybrid circuits 38, 40 provide the electrical interface between the multiple content and auxiliary channels 42, 44, 46 and 48 and the single media 36. These hybrid circuits may take many forms, just a few of which are described in more detail herein. In an exemplary embodiment described below, the hybrid circuit coupled to the multi-media source 32 includes circuitry for converting the differential digital content channels 42 from the multi-media source 32 into a plurality of single-ended digital content channels for transmission over the single media 36. The hybrid circuit coupled to the multi-media sink 34 receives these single-ended digital content channels from the single media 36 and converts them back into a plurality of differential digital content channels 42, which are supplied to the multi-media sink 34. The hybrid circuits 38, 40 may also include circuitry for combining the digital content channels 42 with the auxiliary channels 44, 46, 48, and for separating the auxiliary channels from the content channels depending upon whether the auxiliary channel is unidirectional or bidirectional. In one exemplary embodiment, the hybrid circuits utilize frequency multiplexing/demultiplexing to combine/separate the content channels and the auxiliary channels.

Although shown as a single media 36 in FIG. 3, in other exemplary embodiments the interface system may utilize a plurality of media to transport the digital content channels and the auxiliary channels. For example, in one embodiment, a separate media is used to transport each of the plurality of single-ended digital content channels between the first and second multi-media devices 32, 34. Each of these digital content channels may then be combined with one or more auxiliary channels via the hybrid circuitry 38, 40. The transport media 36 may include copper, such as coaxial and twisted-pair cables, as well as non-copper transmission media.

Figure 4:
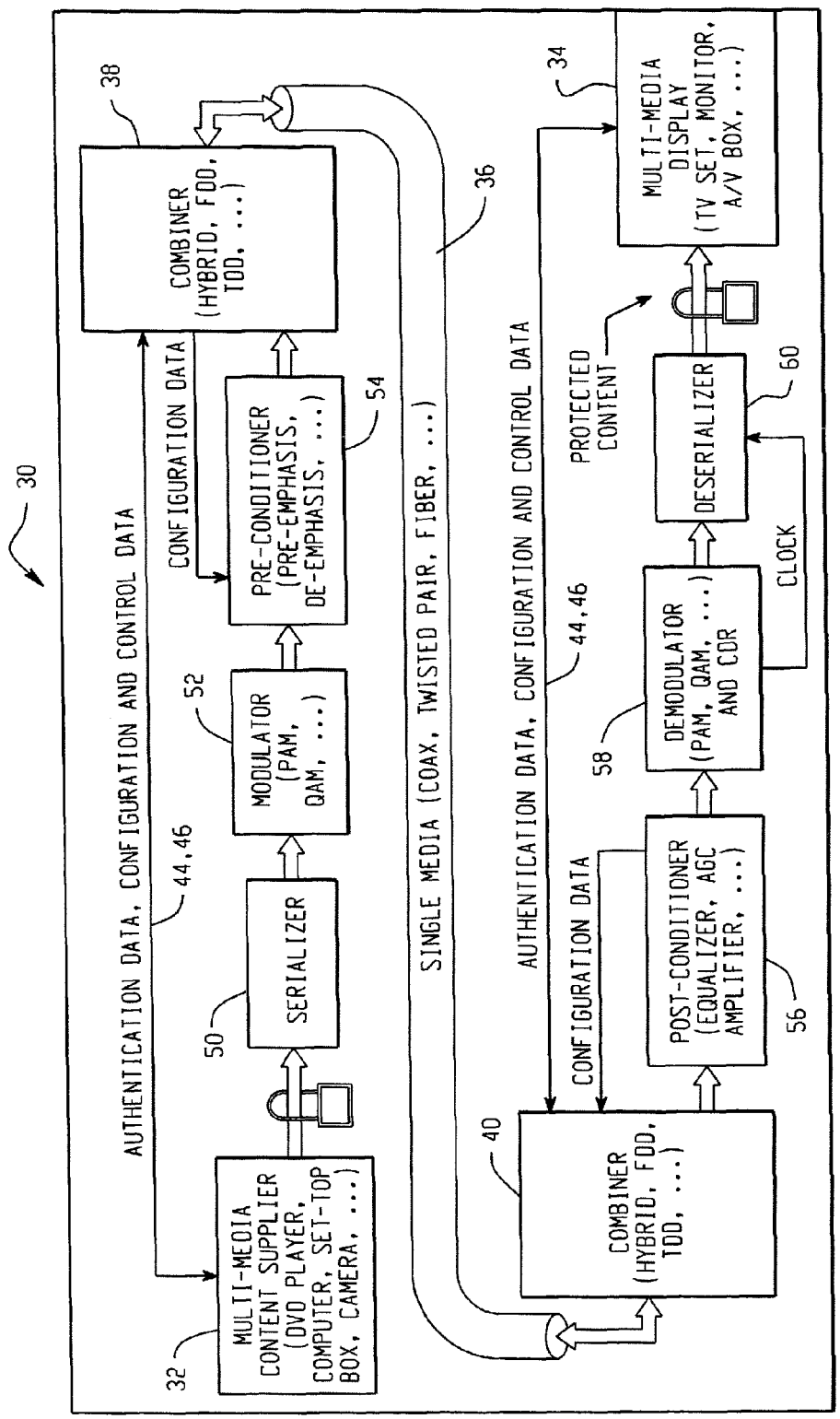
FIG. 4 is a more detailed block diagram of an exemplary multi-media digital interface system.

FIG. 4 is a more detailed block diagram 30 of an exemplary multi-media digital interface system. This system 30 couples a first multi-media digital device 32 to a second multi-media digital device 34 through a single media 36. The first multi-media digital device 32 is a multi-media content supplier, such as a DVD player, a computer, a set-top box, a camera, etc., and the second multi-media digital device 34 is a display, such as a television or a computer monitor. As noted above, the single media 36 in this example may be a coaxial cable, twisted pair, or fiber optic connection, to name a few example media types.

Positioned on the transmit side between the first multi-media digital device 32 and the single media 36 in this exemplary system are serializer 50, modulator 52, pre-conditioner 54 and combiner circuitry 38. On the display side of the system, a combiner 40, post-conditioner 56, demodulator 58, and deserializer 60 couple the single media 36 to the second multi-media digital device 34. The operation of these exemplary circuit elements is described in more detail below.

In the system shown in FIG. 4, a multi-media content supplier 32 outputs content protected data to a serializer unit 50. The content protected data preferably comprises a plurality of differential digital content channels, such as the TMDS content channels of an HDMI signal, which are converted into a plurality of single-ended digital content channels and then serialized into a single bit stream by the serializer 50. By converting the content channels from differential to single-ended signals, and then serializing the data into a single bit stream, all of the content channels can be transported over a single media 36, such as a coaxial cable, thus eliminating the need for more complex multi-twisted pair cables, such as typically found in HDMI and DisplayPort applications.

Figure 1:
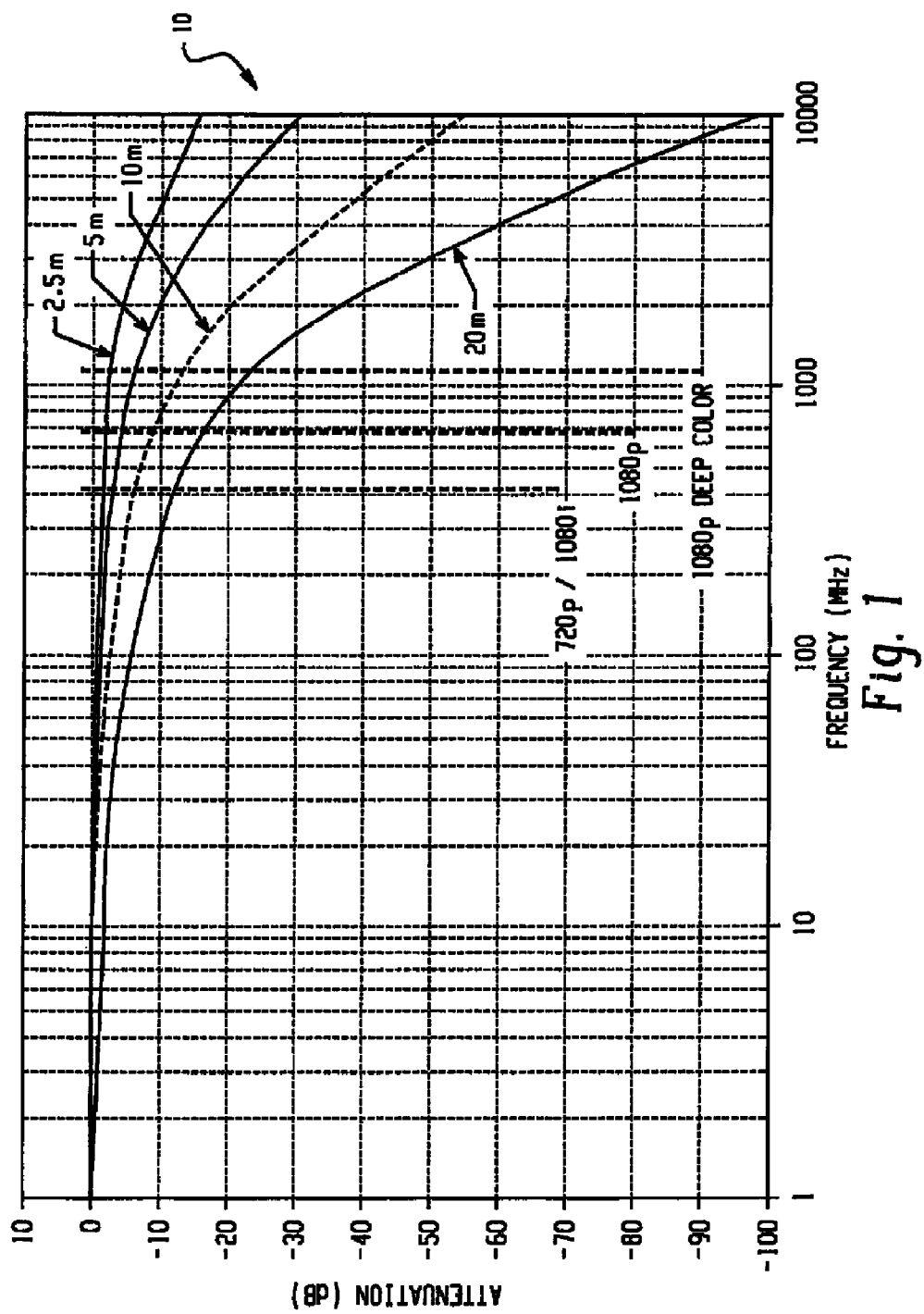
FIG. 1 is a plot showing the typical loss characteristics of an HDMI, DVI, or DisplayPort type cable.
Figure 2:
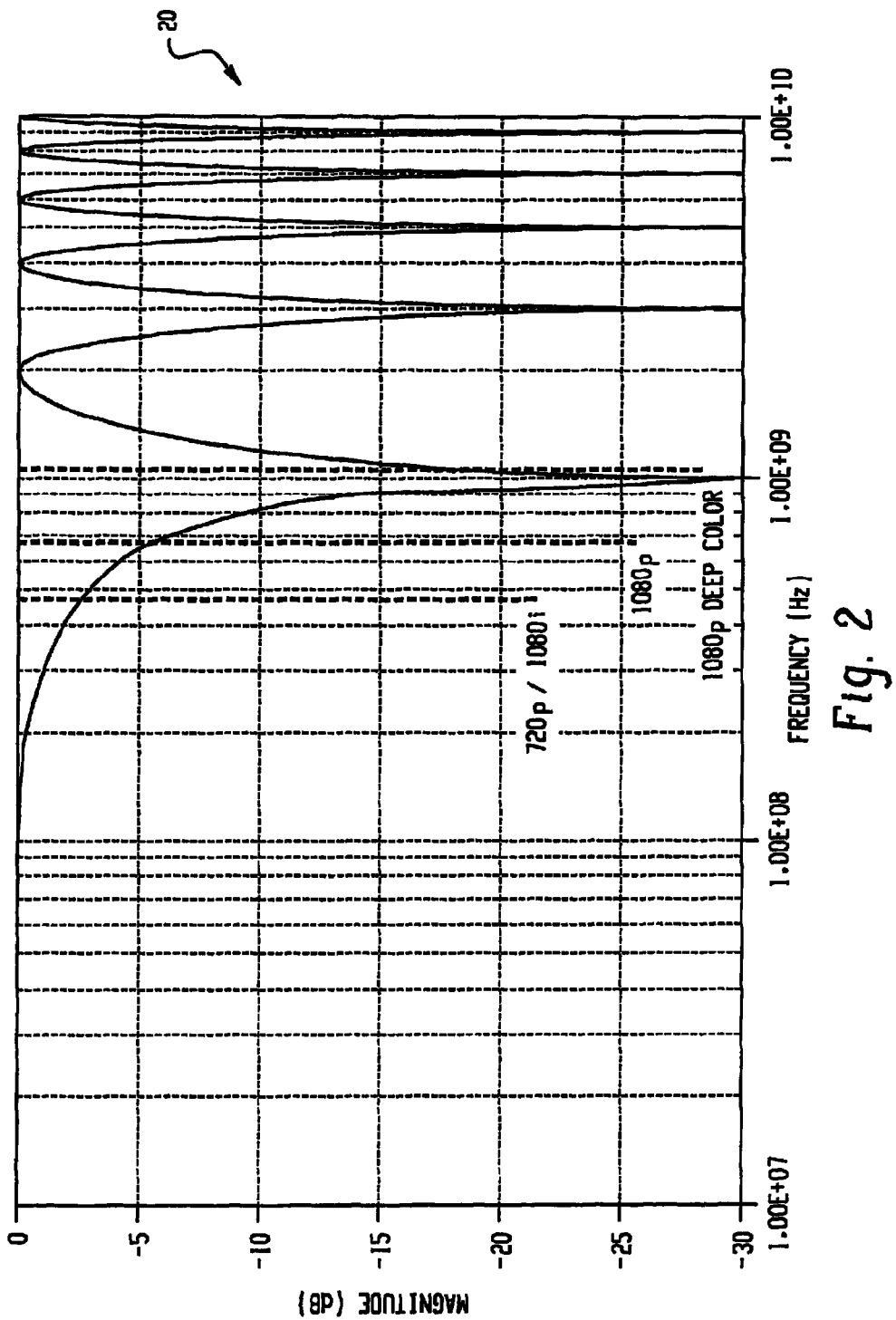
FIG. 2 is a plot showing the typical cable attenuation response as a function of intra-pair skew of an HDMI, DVI, or DisplayPort type cable.
Figure 5:
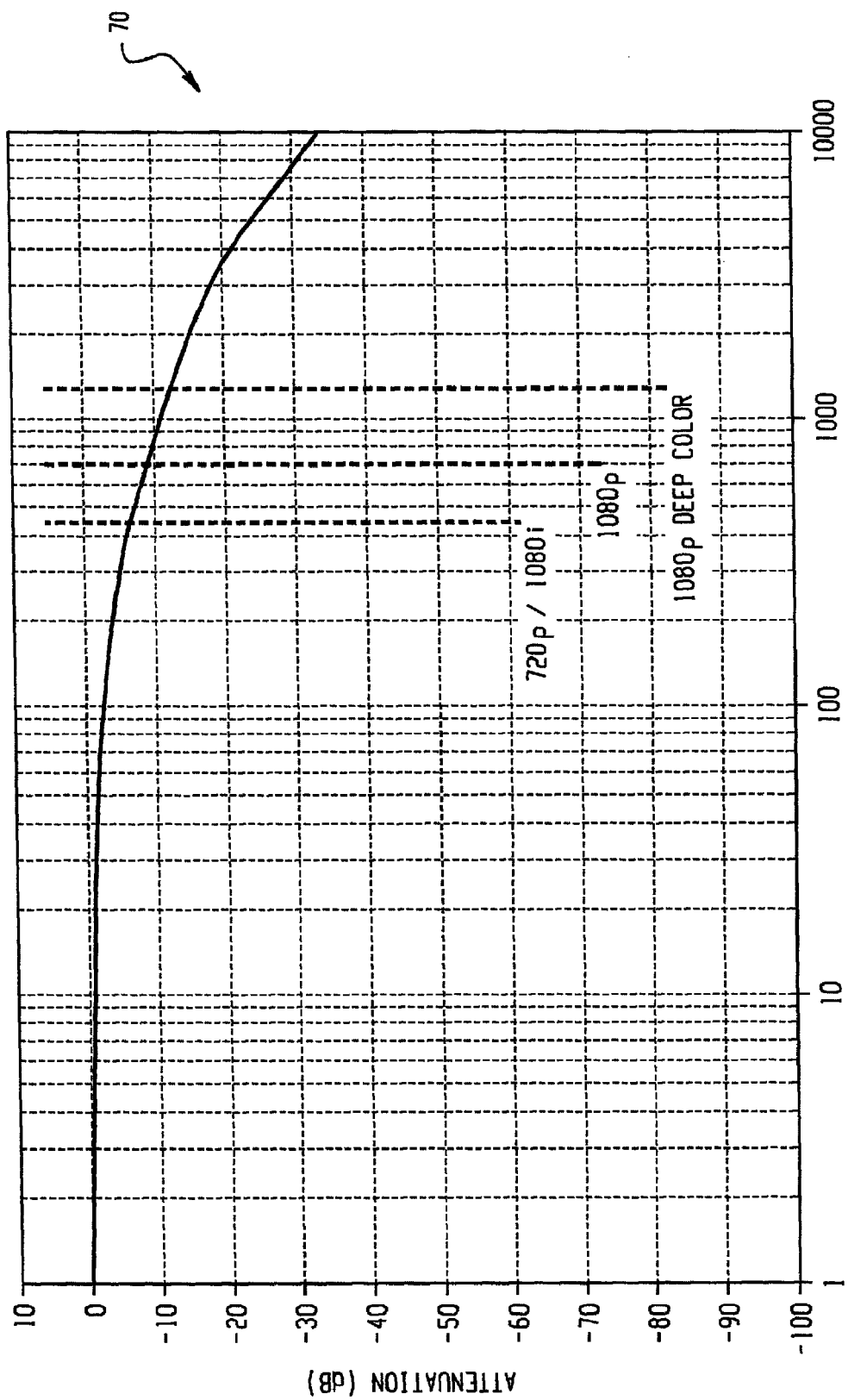
FIG. 5 is a plot showing the typical loss characteristics of a single media coaxial cable.

FIG. 5 is a plot showing the typical loss characteristics of a single media coaxial cable. It can be seen that the cable attenuation at 30 meters of sub-miniature RG59/U coaxial cable is roughly equivalent to 10 meters of typical HDMI cable as shown in FIG. 2, a three times improvement in performance. Thus, in addition to simplifying the physical interface, the system shown in FIG. 4 provides much better electrical performance at longer cable lengths.

Also provided to the serializer from the multi-media source 32 may be a clock channel and one or more auxiliary data channels. This serialized bit-stream is then modulated 52 and pre-conditioned 54 based on the channel characteristics of the single media 36. Various modulation schemes can be used in this system, such as PAM, QAM, etc., in order to maximize data throughput over the single media. In addition, the modulation can take place either before or after the auxiliary channels are combined with the content channels by the combiner 38.

Examples of pre-conditioning 54 may include pre-emphasizing and de-emphasizing, which essentially shape the spectrum of the signal to better match the channel response. For more precise operation, the pre-conditioner 54 typically needs some information from the transmission channel. To accomplish this, channel estimation data is fed either directly from the post-conditioner 56 or between the multi-media source 32 and the pre-conditioner 54 (on the transmit side) and the post-conditioner 56 and multi-media sink 34 (on the display side) over a unidirectional or bidirectional auxiliary back channel 44. Authentication data 46 may also be carried on this or another auxiliary channel. In this exemplary system 30, the information carried over the auxiliary back channel may include encryption data for authentication purposes 46, configuration data 44, such as channel estimation and display EDID information, and possibly other status data, such as hot plug detect information.

After modulation and pre-conditioning, the serialized bit stream on the transmit side of the system 30 is then combined or mixed with the authentication, configuration and control data 44, 46 by combiner circuitry 38 into a single channel of information for transmission over the single media 36. As noted previously, the modulation function may alternatively take place after the combiner 38. Frequency multiplexers, time multiplexers, and/or other forms of hybrid circuits may be used for this combining function. Other methods of combining the content channels with the auxiliary channels may also be employed.

Upon reception, the auxiliary back channel data is separated from the content data via combiner circuitry 40, and distributed to the post-conditioner 56 and multi-media display 34, much in a similar, but reverse fashion to the transmitter-side circuitry. The receiver may include a post-conditioner 56, such as a channel equalizer and AGC amplifier. To apply optimum equalization, channel estimation and adaptive equalization is preferred. The adaptive mechanism may be split between the pre- and post-conditioners 54, 56. Once properly conditioned, the received signal is then demodulated 58 and the clock and data are extracted by a clock and data recovery (CDR) unit. The recovered serial data is then converted back to parallel by a deserializer 60, converted from single-ended to differential signals, and then provided to the multi-media display 34.

In the example system 30 shown in FIG. 4, increased throughput is possible by employing more complicated modulation schemes than the existing binary signaling adopted in some of the current multi-media interfaces. For example, different variations of multi-level modulation schemes, such as PAM and QAM, are examples of technologies that can enable compressing high-bandwidth information into the smaller bandwidth of the transmission channel. Squeezing more data in less bandwidth enables high quality multi-media connectivity over longer distances and for higher resolution contents, as well as the ability to multiplex several streams over the same transmission link. Note that the existing or derivations of binary signaling schemes are not excluded and may still be used when found advantageous.

In consumer electronics (CE) connection applications, the existence of an auxiliary back channel, as shown in the system of FIG. 4, is typically required to send and receive data, such as configuration information in both directions. The technology described herein extends the use of the single media for establishing this connectivity between CE devices such as DVD players, A/V receivers, DVRs, and PVRs. A typical application would be a unified single-cable connection between a DVD player and a TV set that carries the video and audio information from the DVD player to the TV set, as well as configuration and control information between both devices and in both directions. Examples of bidirectional information include the authentication data that both devices handshake before a secure link is established, as well as access of the DVD player to the audio and video capabilities and formats supported by the TV set (EDID information) in order to properly condition the content.

Figure 6:
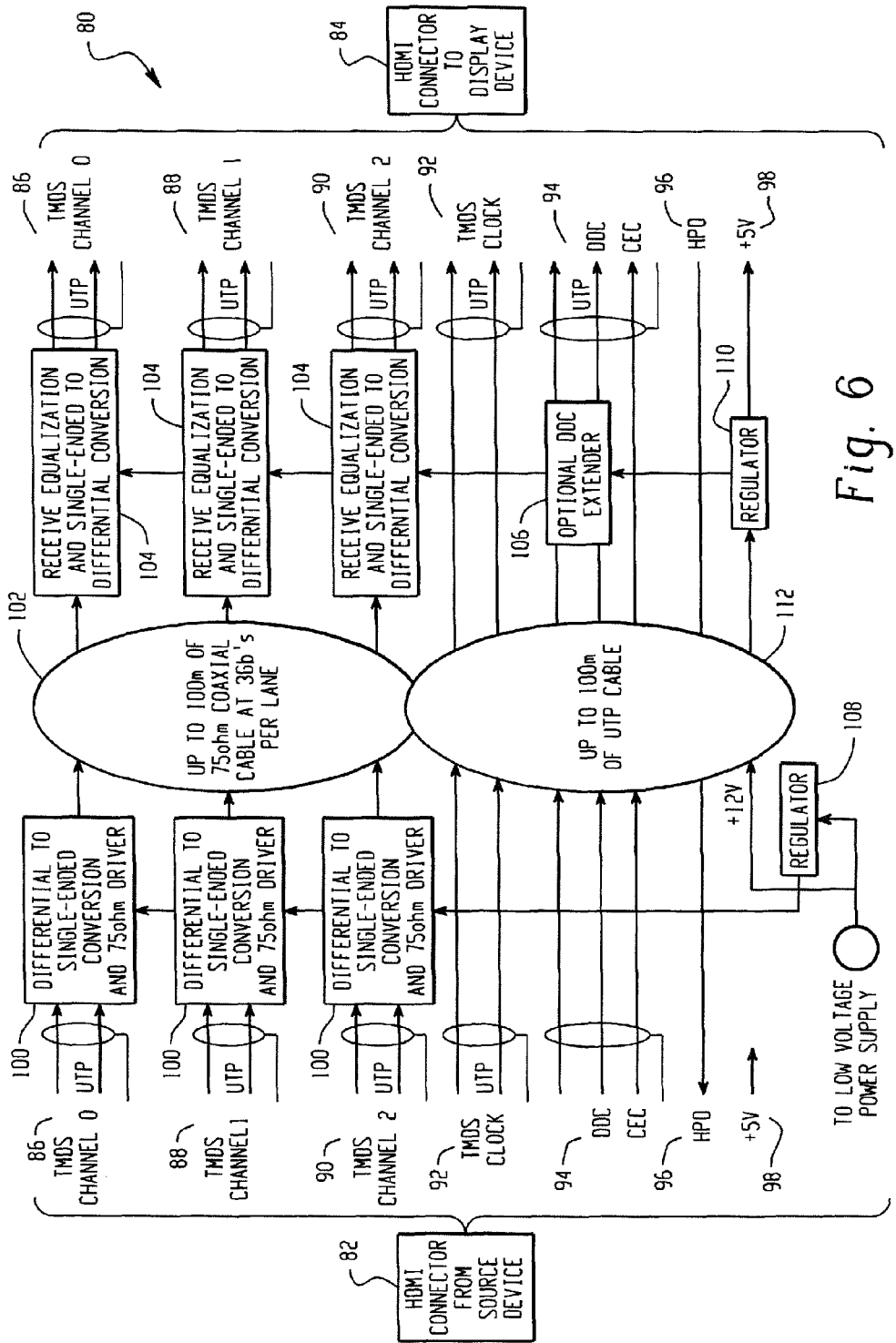
FIG. 6 is a block diagram of another example multi-media digital interface for transporting digital content over a plurality of single-ended media.

FIG. 6 is a block diagram 80 of another example multi-media digital interface for transporting digital content over a plurality of single-ended media. More particularly, this example interface shown in FIG. 6 illustrates a long-reach HDMI active cable assembly. An active cable assembly is one that includes the circuitry for performing differential to single-ended conversion 100 and single-ended to differential conversion 104 within the cable assembly itself This type of implementation will typically include power conversion circuitry 108 to supply 5 volt DC power to the active electronics 100, 104, 106 in the cable assembly. By replacing the differential, twisted pair copper connections with single-ended, coaxial connections 102, significant performance improvements, especially with respect to maximum cabling length, may be achieved using this active cable assembly. This performance improvement is primarily due to the elimination of intra-pair skew effects and improved frequency response of coaxial cable as compared to the existing twisted pair solution that is used in present HDMI connections.

Although an active cable assembly is shown in FIG. 6, this is just one example implementation of the technology described in this patent document. Other implementations are also possible, such as, for example, providing a passive cable assembly, which is interfaced to the multi-media equipment 82, 84 through one or more external black boxes housing the active electronics shown in FIG. 6. In another implementation, the active electronics for performing the differential to single-ended conversion 100 and single-ended to differential conversion 104 are housed within the multi-media equipment itself. In this later example implementation, the multi-media equipment may be provided with a standard differential-type output connector, such as the commonly-used HDMI connector found in present equipment, and the equipment may also include one or more coaxial cable connectors for providing single-ended output signals corresponding to the differential signal lanes in the HDMI connector.

Turning back to the details of FIG. 6, the active cable assembly is connected between a first multi-media source device 82, located on the left-hand side of the figure, which may be a DVD player, for example, and a second multi-media display device 84, located on the right-hand side of the figure, which may be an LCD display. In this example implementation, the active electronics 100, 104 for converting the HDMI differential signals to and from single-ended signals are integrated into the cable assembly. As noted above, these electronic devices may also be placed into a separate interface device, or may be integrated into the multi-media equipment itself.

The example digital interface shown in FIG. 6 includes three TMDS data channels, labelled TMDS Channel 0 (86), TMDS Channel 1 (88), and TMDS Channel 2 (90). The interface also includes a TMDS clock signal 92, a DDC/CEC control signal pair 94, a hot-plug detect (HPD) signal 96, and a +5V DC power line 98. These signals may be output from the multi-media source device and input to the display device using standard HDMI type connectors 82, 84.

As shown in FIG. 6, the active cable assembly includes differential to single-ended converters 100 on the transmitter side of the cable, preferably one such converter on each of the content data channels (TMDS signals), for converting the differential signals into single-ended signals, which are then provided to a 75 Ohm driver circuit for driving up to 100 meters of coaxial cable 102 at 3 Gb/sec to the receive end of the active cable assembly. On the receive side of the active cable assembly, a plurality of optional receive equalization circuits provide a measure of equalization for the received single-ended signals, and corresponding single-ended to differential converters 104 convert the single-ended signals back into differential signals that are provided to the display device HDMI connector 84.

Although the TMDS clock signal 92 in FIG. 6 is shown as being twisted pair UTP cabling between the source and display devices, alternatively the TMDS clock signal 92 may be converted from differential to single-ended form to improve its transmission characteristics over longer cable lengths and then transmitted over a coaxial or other single-ended transmission medium. The clock signal 92 in this embodiment may be transmitted over a separate single-ended transmission medium from the content data channels 86, 88, 90, or it may be combined with one of the content data channels and transmitted over a common single-ended transmission medium.

As noted above, an optional DDC extender circuit 106 may also be included in the active cable assembly shown in FIG. 6 to extend the reach of the DDC/CEC control channel 94. This DDC extender circuit 106, for example, may be of the type disclosed in U.S. patent application Ser. No. 10/388,916, titled "Digital Communication Extender System and Method," which is assigned to the assignee of this application, and incorporated herein by reference. This auxiliary configuration channel may be transmitted over a separate UTP cable, as shown in FIG. 6, or it may be combined with one of the content data channels and transmitted over the single-ended transmission medium. In this case, appropriate combiner circuitry should be integrated into the active cable assembly, similar to that described above with respect to FIG. 4 and/or below with respect to FIGS. 7-15.

Figure 7:
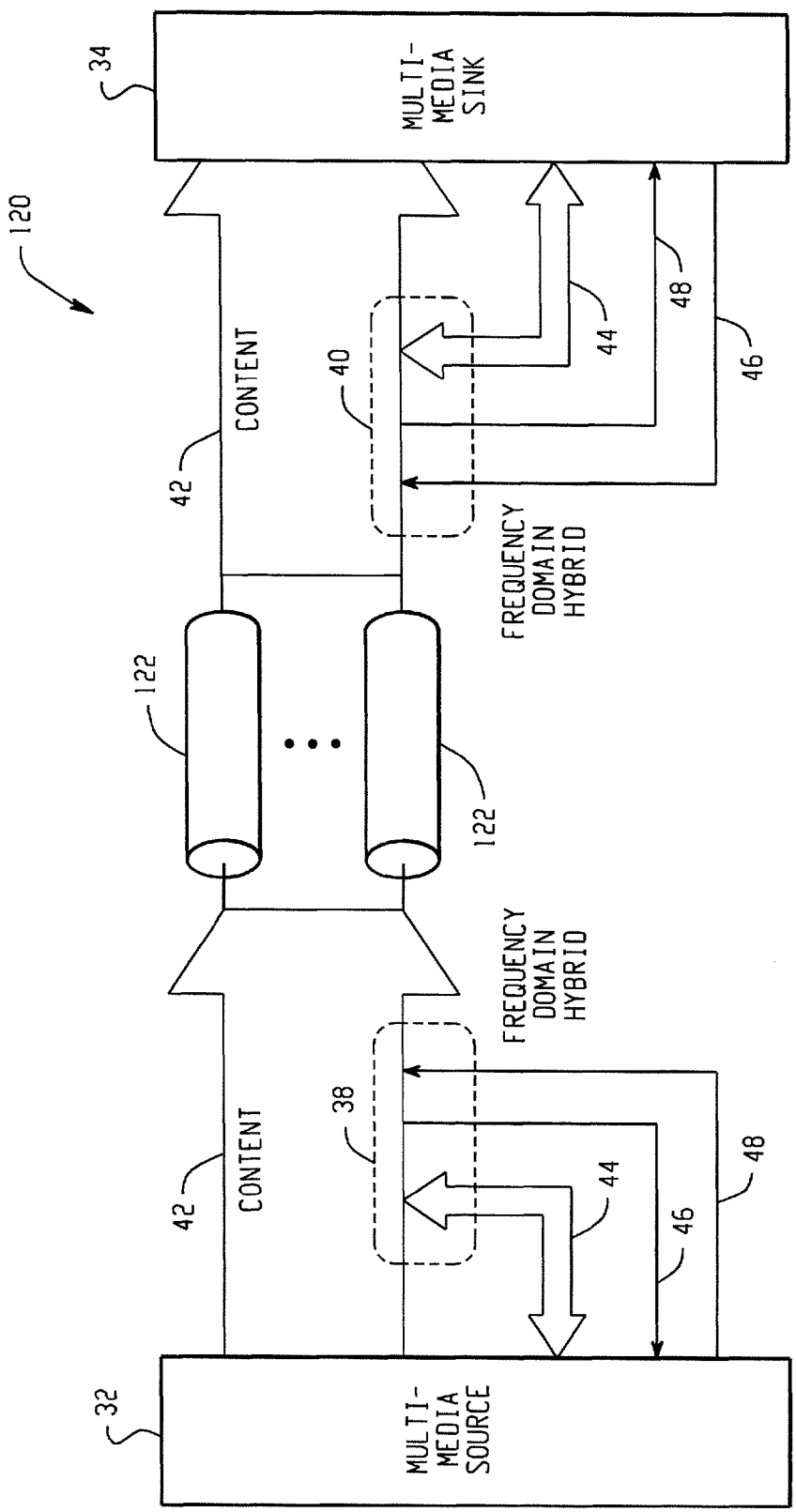
FIG. 7 is a block diagram of another example multi-media digital interface for transporting digital content and configuration data over a plurality of single ended media using frequency multiplexing.

FIG. 7 is a block diagram 120 of another example multimedia digital interface for transporting digital content and configuration data over a plurality of single ended media 122 using frequency multiplexing. Although frequency multiplexing is described with reference to the example of FIG. 7, it should be understood that other forms of combining the digital content channels 42 with the auxiliary channels 44, 46, 48 may also be utilized with this system interface.

As shown in FIG. 7, a multi-media source device 32, such as a DVD player, is coupled to a multi-media sink device 34, such as a high-definition display, through an interface system comprising transmit and receive-side frequency domain hybrids 38, 40 and a plurality of single-ended media 122. The one or more frequency domain hybrids 38 on the transmit side of the interface combine the one or more digital content channels 42 (which may include the high-frequency clock channel) with the auxiliary channels 44, 46, 48, depending upon the precise implementation. The auxiliary channels may include configuration and control channels 44, status channels 46 and supply channels 48. After combining the signals in the frequency domain hybrids 38, the combined signals are transmitted over the plurality of single ended media 122 to the receive side of the interface. On the receive side of the interface, one or more frequency domain hybrids 40 de-combine or demultiplex the auxiliary channels 44, 46, 48 from the digital content channels 42, which are then collectively routed to the multi-media sink device 34.

In the example system interface shown in FIG. 7, the auxiliary and content channels are frequency multiplexed using the frequency domain hybrids 38, 40. Other forms of multiplexing/combining may also be used in this interface, such as time division multiplexing, etc. As described in more detail in further example implementations set forth below, each of the frequency domain hybrids may include a high-pass input for receiving a high-frequency digital content channel (or a high-frequency digital clock channel), and one or more low pass or band pass inputs for receiving one or more unidirectional or bidirectional auxiliary channels 44, 46, 48. The signals applied to these inputs are then multiplexed in the hybrid 38 and provided to the media 122 in the form of a combined frequency-multiplexed output signal. On the receiver side, the hybrid 40 is inverted from the hybrid 38 on the transmitter side, such that it comprises a single input and a plurality of outputs corresponding to the high-frequency digital content channel 42 and the one or more lower frequency auxiliary channels 44, 46, 48. The functionality provided by these hybrids 38, 40 may be located within the source 32 and sink 34, or may be located within a housing external to the source 32 and sink 34, or may be located within an active cable assembly coupling the source 32 to the sink 34.

Figure 8:
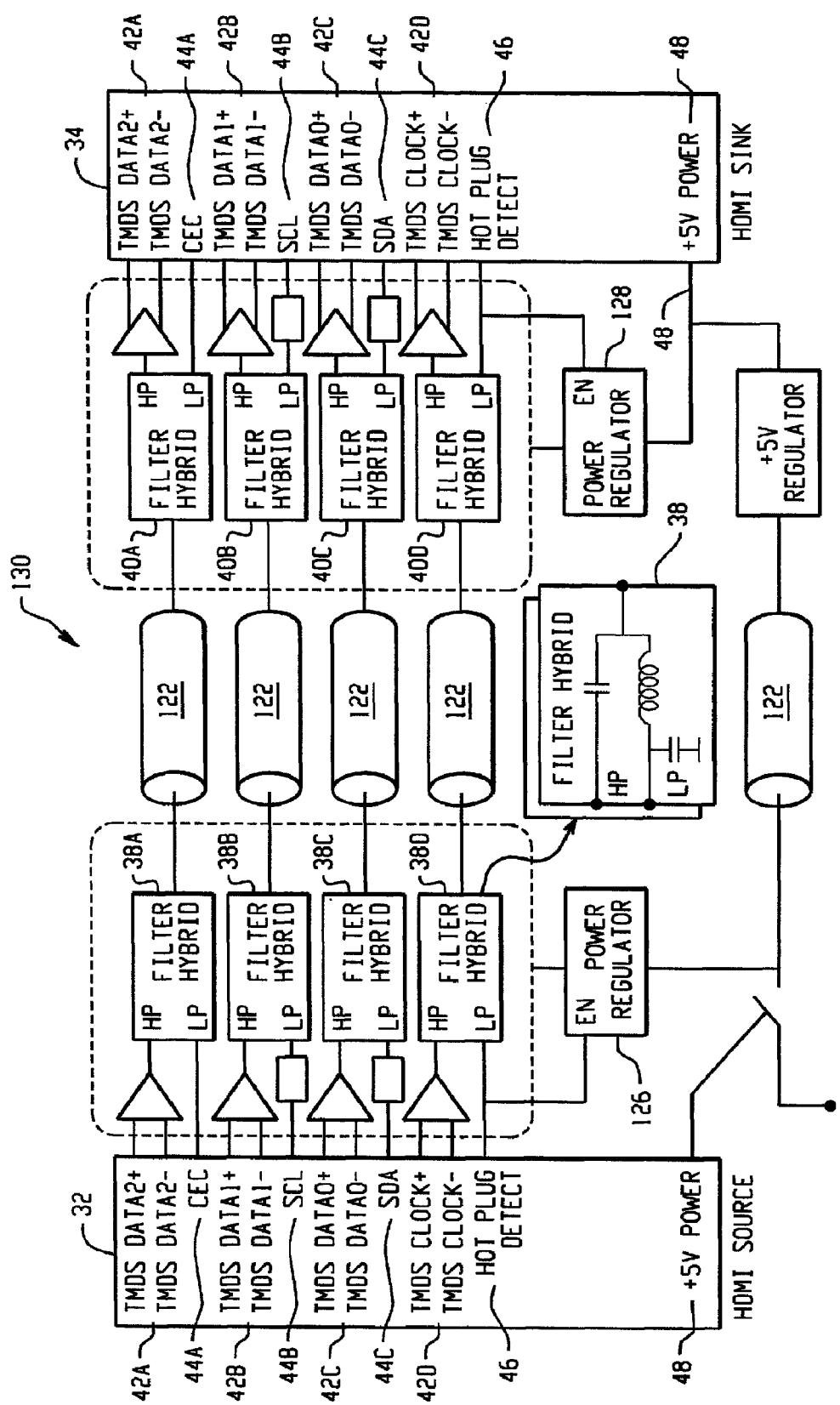
FIG. 8 is a more detailed block diagram of the example multi-media digital interface shown in FIG. 7 configured to transport HDMI content and configuration data over a plurality of single-ended media using frequency multiplexing.

FIG. 8 is a more detailed block diagram 130 of the example multi-media digital interface shown in FIG. 7 configured to transport HDMI content and configuration data channels over a plurality of single-ended media using frequency multiplexing. On the transmit side of the interface, a plurality of filter hybrids 38A, 38B, 38C, 38D are used to frequency multiplex the HDMI content channels (including the three TMDS data channels and the TMDS clock channel) with the CEC, SCL, SDA and hot plug detect (HPD) auxiliary channels. And on the receive side of the interface a similar plurality of filter hybrids 40A, 40B, 40C, 40D are used to demultiplex the content channels from the auxiliary channels.

The first filter hybrid 38A on the transmit side of the interface receives a single-ended version of the differential TMDS DATA2 content signal 42A on its high pass input and the CEC auxiliary channel 44A on its low pass input. These two signals 42A, 44A are then frequency multiplexed in the filter hybrid 38A, which produces a combined frequency multiplexed signal at its output. This combined signal is then transported over the coaxial medium 122 to the receive side of the interface where it is received by the corresponding filter hybrid 40A. The first receive filter hybrid 40A demultiplexes the single-ended TMDS DATA2 signal onto its high pass output and the CEC auxiliary channel onto its low pass output. The single-ended TMDS DATA2 signal is subsequently converted back into a differential signal and then provided to the HDMI sink 34.

In a similar fashion, the TMDS DATA1 content signal 42B is converted to single-ended, combined with the SCL auxiliary channel 44B in the second transmit side filter hybrid 38B, and then transported over a separate coaxial medium 122 to the receive side filter hybrid 40B. The second receive side filter hybrid 40B receives the combined TMDS DATA1 content signal and SCL auxiliary channel 44B and demultiplexes these signals for provision to the HDMI sink device 34. The TMDS DATA0 content signal 42C is likewise transported over a separate coaxial medium 122 in a combined form with the SDA auxiliary channel 44C, and the TMDS CLOCK signal 42D is transported with the HPD status channel 46.

Also shown in FIG. 8 is an optional power channel separate from the combined content/auxiliary channel mediums 122 for providing power from the HDMI source 32 to the HDMI sink 34, and for providing power to the active electronics of the multi-media interface, such as the differential to single-ended converters on the transmit side of the interface and the equalizer and single-ended to differential converters on the receive side of the interface. Regulated power to these electronics may be provided on the transmit side by power regulator 126 and on the receive side by power regulator 128. These regulators 126, 128 may be enabled by the hot plug detect signal 46. The 5V power is also directly provided to the HDMI sink to establish a seamless 5V connection between the HDMI source and sink as per the HDMI link requirement.

Figure 9:
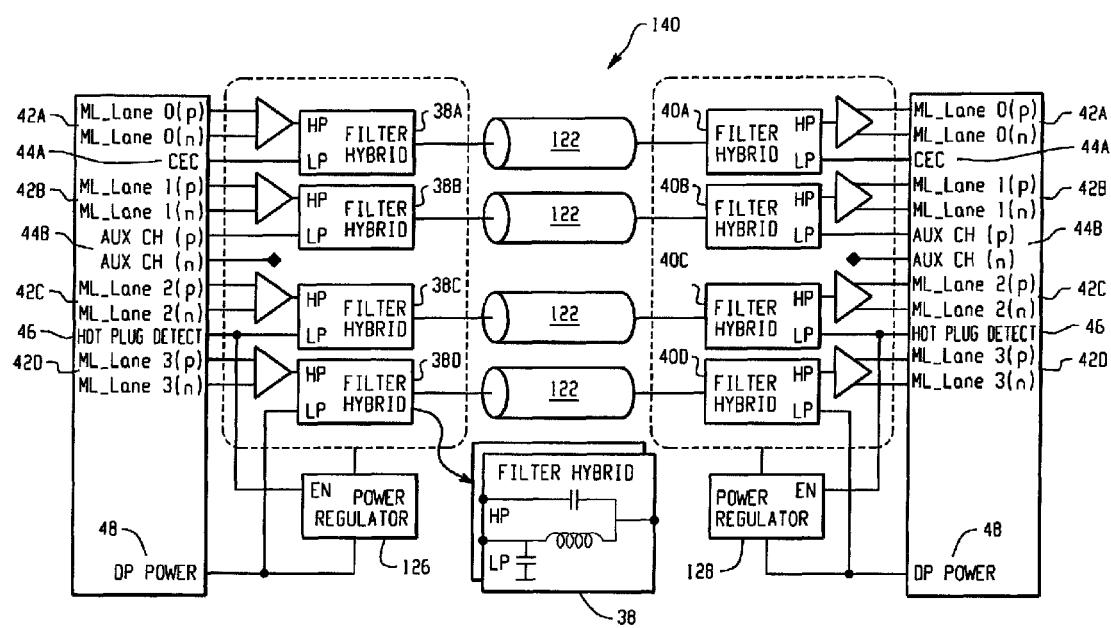
FIG. 9 is a more detailed block diagram of the example multi-media digital interface shown in FIG. 7 configured to transport DisplayPort content and configuration data over a plurality of single-ended media using frequency multiplexing.

FIG. 9 is a more detailed block diagram 140 of the example multi-media digital interface shown in FIG. 7 configured to transport DisplayPort content and configuration data over a plurality of single-ended media using frequency multiplexing. This example is almost identical to the example HDMI interface shown in FIG. 8, except that the optional power channel is combined with one of the digital content channels 42D and transported over a combined channel medium 122. In this configuration, the DisplayPort ML_LANE0 content signal 42A is combined with the CEC auxiliary channel. The DisplayPort ML_LANE1 content signal 42B is combined with the HPD signal 46. The DisplayPort ML_LANE2 content signal 42C is combined with the AUX CH 44. And the DisplayPort ML_LANE3 content signal 42D is combined with the power channel 48. Otherwise, the methodology for converting from differential to single-ended and vice versa, and combining the content signals 42 with the auxiliary channels 44, 46, 48 in this example is done using the same frequency multiplexing hybrids 38, 40 discussed above in connection with FIG. 8.

The example multi-media interface systems shown in FIGS. 8 and 9 utilize an interchangeable and reversible frequency multiplexing/demultiplexing filter hybrid 38, 40 that provides one high-pass input, one low-pass input and one composite output in a first configuration 38, and can be reversed to provide the second configuration 40. In the first configuration 38 the hybrid 38 performs a multiplexing function while in the second configuration 40 the hybrid 40 performs a demultiplexing function. The output in the first configuration 38 encompasses all the inputs lined up in frequency in a frequency-multiplexed manner. Channel mappings to the multi-media interface depends on the specific application, but one example scenario is to assign the high-pass spectrums to the main (or content) channels and the low-pass spectrums to the corresponding auxiliary channels as explained above.

FIG. 10 is an example channel-to-spectrum mapping table for the example interfaces shown in FIGS. 8 and 9. The top portion of the mapping table shows the five-cable HDMI interface set forth in FIG. 8. In this example interface, the frequency multiplexing hybrids 38, 40 include high-pass and low-pass inputs for the respective content channels (DATA2, DATA1, DATA0 and CLOCK) and the auxiliary channels (CEC, SCL, SDA and HPD). There is no multiplexing on the separate power cable (Cable 5) in this example scenario. The next portion of the table immediately below the HDMI interface is the four-cable DisplayPort interface set forth in FIG. 9. Similar to the HDMI example shown in FIG. 8, in the multi-cable DisplayPort example shown in FIG. 9, the frequency multiplexing hybrids 38, 40 include only high pass and low pass inputs.

Just below the multi-cable DisplayPort example in the mapping table are two alternative single-cable DisplayPort mappings. In the first single-cable example, there is no power channel and therefore the single content channel (Lane 0) is multiplexed with the AUX channel and the HPD channel using a first band pass input and a low pass input on the frequency multiplexing hybrids 38, 40. In the second single-cable example, which includes a power channel, the single content channel (Lane 0) is multiplexed with the AUX channel, the HPD channel and the power channel using first and second band pass inputs and a low pass input on the frequency multiplexing hybrids 38, 40.

Depending on the application and the supported options, the cut-off frequencies of the various filters that make up the frequency multiplexing hybrids 38, 40 will vary. FIG. 11 is an example cut-off frequency table for the example interfaces shown in FIGS. 8 and 9 and the two single-cable DisplayPort interfaces discussed in connection with FIG. 10. The numerical values set forth in FIG. 11 represent examples and are only meant to provide insight into what a typical solution may look like. The exact cut-off frequencies of the filters depend on a number of factors, including the number of multiplexed channels, the required isolation between them, the signal levels, and other practical considerations that are driven primarily by the application.

Figure 12A:
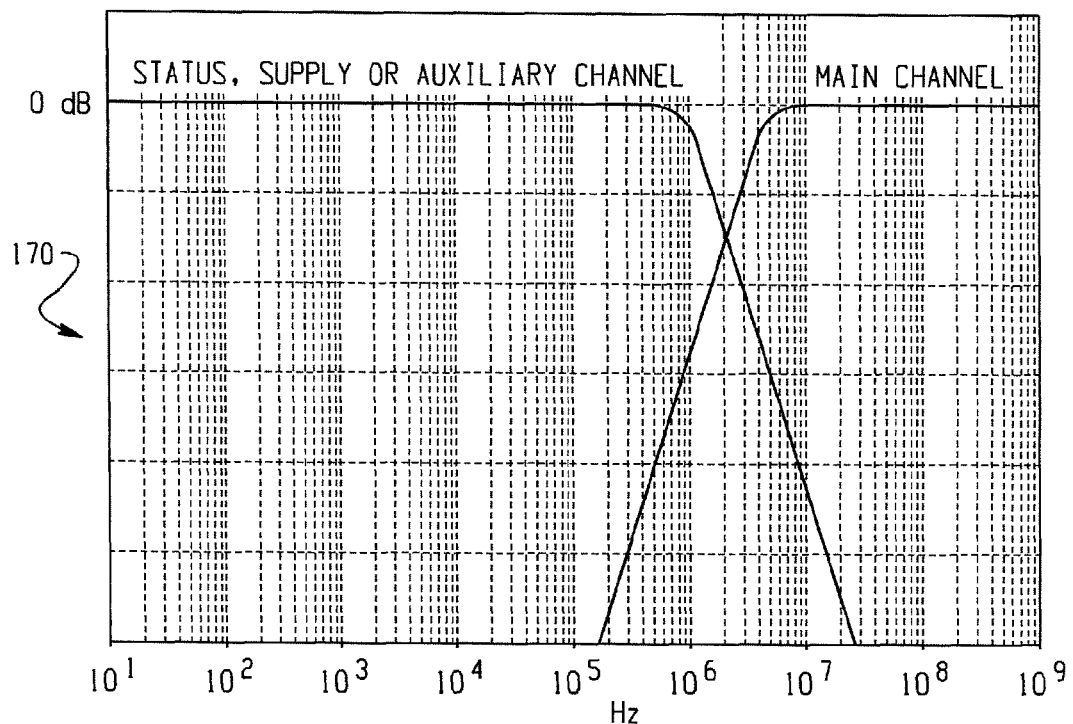
FIGS. 12A and 12B are example plots showing the frequency multiplexing in the plurality of single-ended media for the example HDMI interface shown in FIG. 8 and the DisplayPort interface shown in FIG. 9.
Figure 12B:
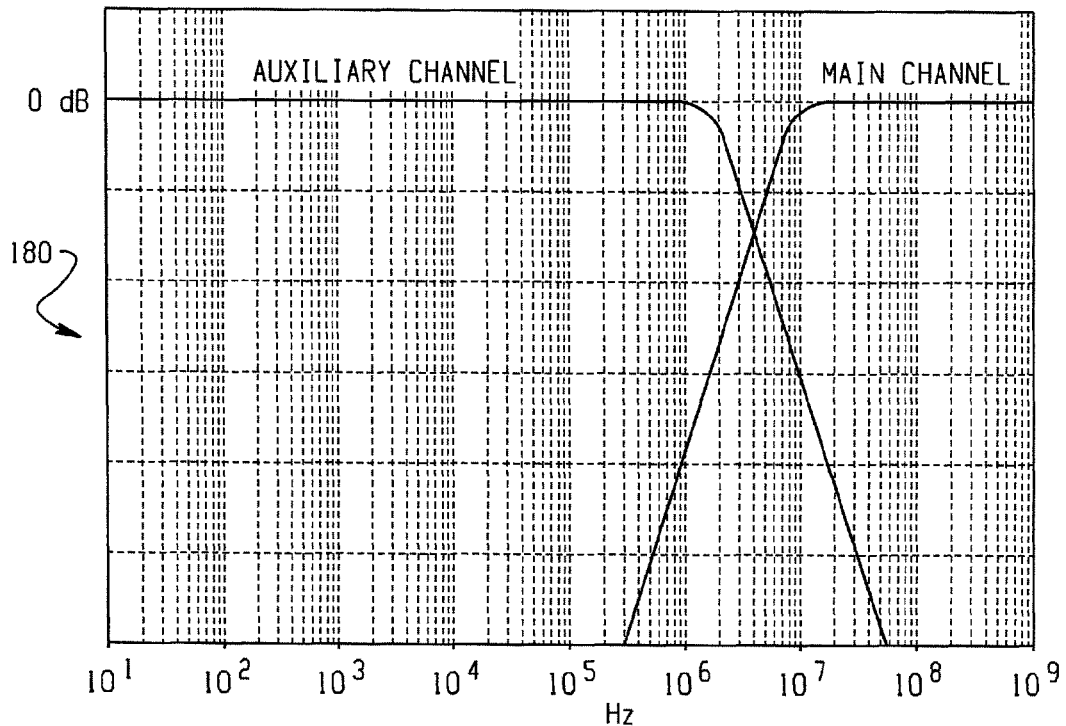

FIGS. 12A and 12B are example plots 170, 180 showing the frequency multiplexing in the plurality of single-ended media for the example HDMI interface shown in FIG. 8 and the example DisplayPort interface shown in FIG. 9. The plot 170 in FIG. 12A shows the multiplexing of a main content channel with one of the status, supply or auxiliary channels. The plot 180 in FIG. 12B shows the multiplexing of a main content channel with the AUX channel of the DisplayPort interface, which typically requires a larger bandwidth.

Figure 13A:
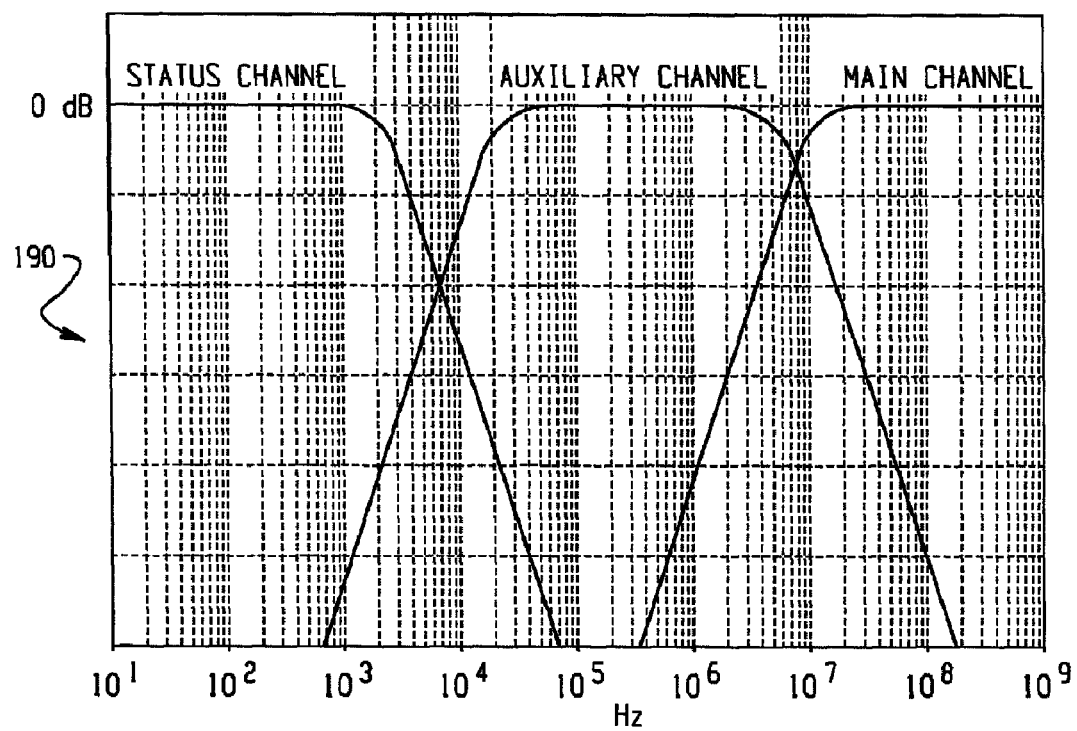
FIGS. 13A and 13B are example plots showing the frequency multiplexing in the DisplayPort over single cable interfaces described at the bottom of the table in FIG. 10.
Figure 13B:
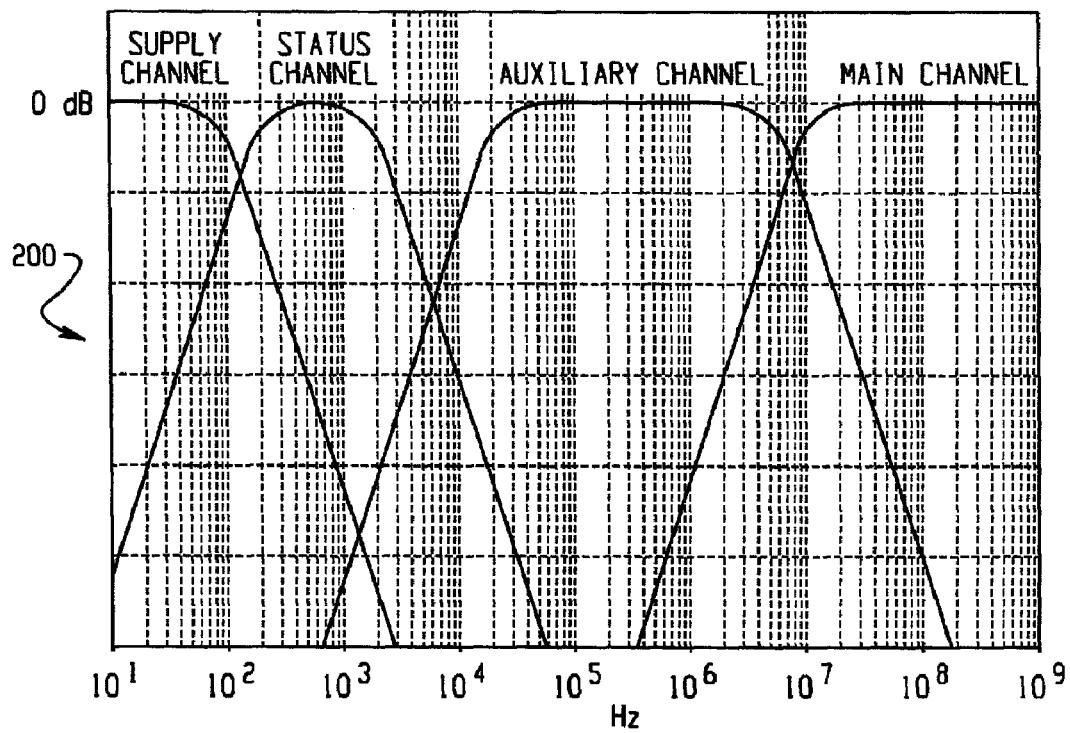

FIGS. 13A and 13B are example plots 190, 200 showing the frequency multiplexing for the two example single-cable DisplayPort interfaces identified in connection with the mapping table of FIG. 10. The first plot 190 shown in FIG. 13A shows the example without the power channel in which the main (or content) channel is multiplexed with an auxiliary channel (band pass) and a status channel (low pass). And the second plot 200 shown in FIG. 13B shows the example with the power channel in which the main channel is multiplexed with an auxiliary channel (first band pass), a status channel (second band pass) and the power channel (low pass).

Figure 14A:
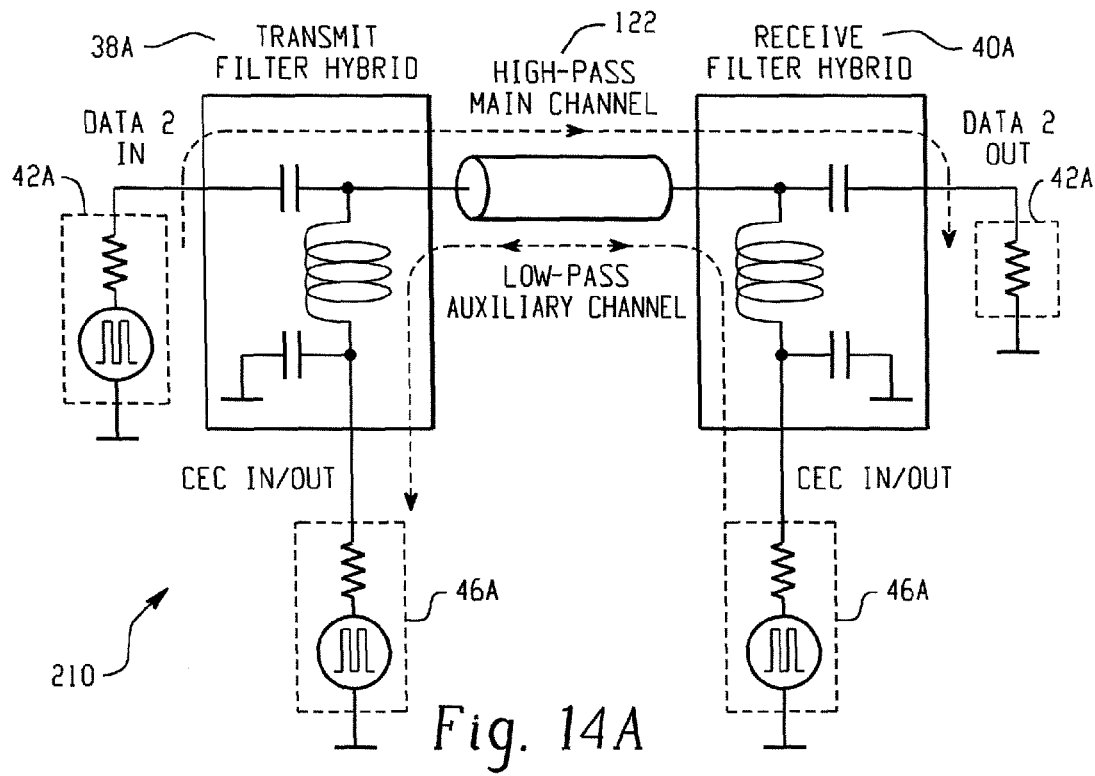
FIGS. 14A through 14E are more detailed circuit schematics of the HDMI interface shown in FIG. 8.

FIGS. 14A through 14E are more detailed circuit schematics of the HDMI interface shown in FIG. 8. FIG. 14A shows the frequency multiplexing and demultiplexing of the HDMI DATA2 content channel 42A with the CEC auxiliary channel 44A via the transmit and receive filter hybrids 38A, 40A. The DATA2 content channel 42A is coupled to the high pass input of the transmit filter hybrid 38A and the bidirectional CEC channel 44A is coupled to the low pass input of the same hybrid 38A. These two signals are frequency multiplexed in the hybrid 38A by operation of the combined high pass and low pass filters therein and output as a combined signal on the coaxial medium 122. At the receive filter hybrid 40A, the combined signal from the coaxial medium 122 is supplied to the high pass and low pass filters of the receive hybrid 40A, which frequency demultiplexes the combined signal into a high pass output (DATA 2) 42A and a low pass output (CEC) 44A.

Figure 14B:
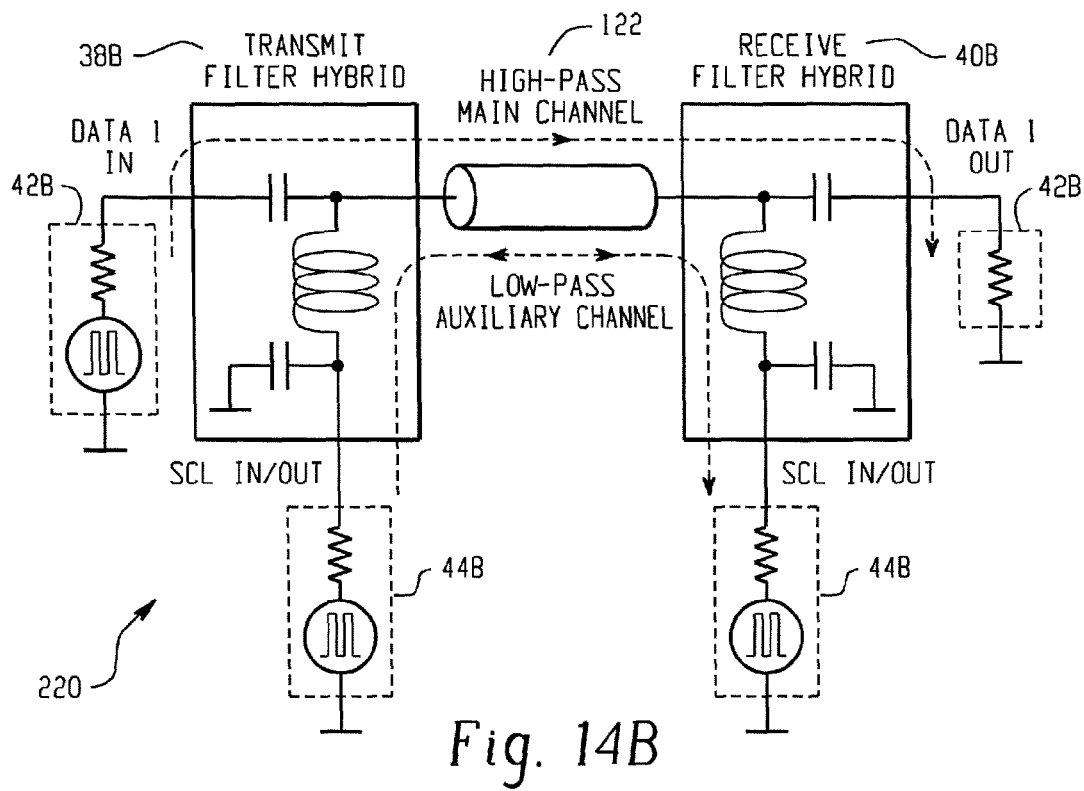
Figure 14C:
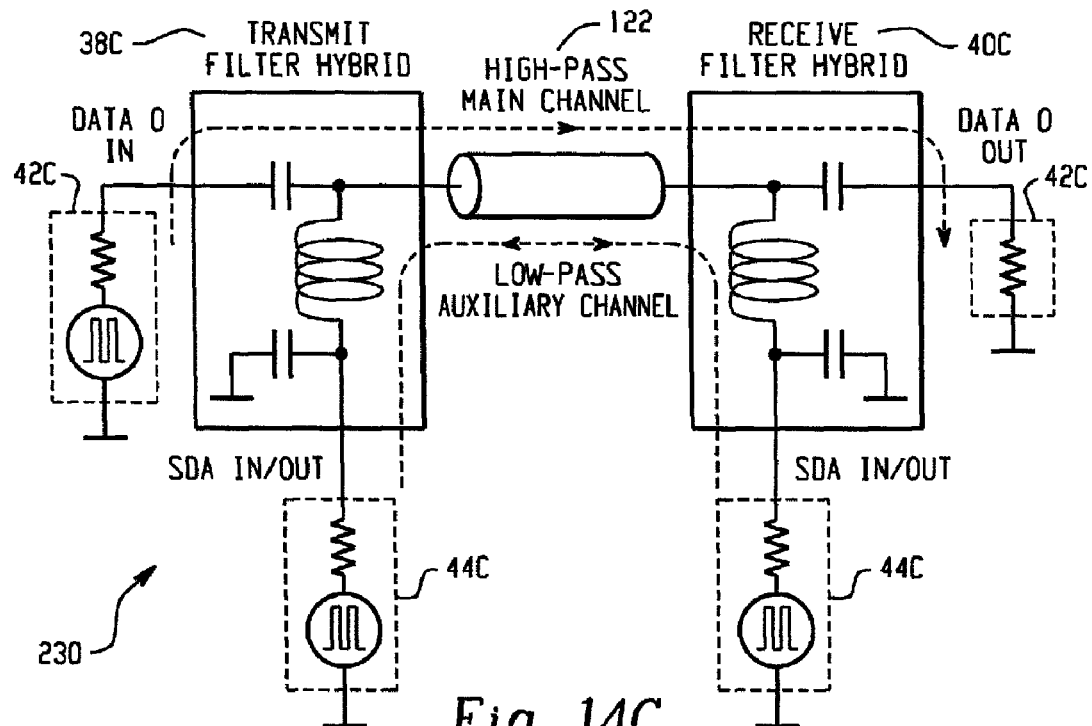
Figure 14D:
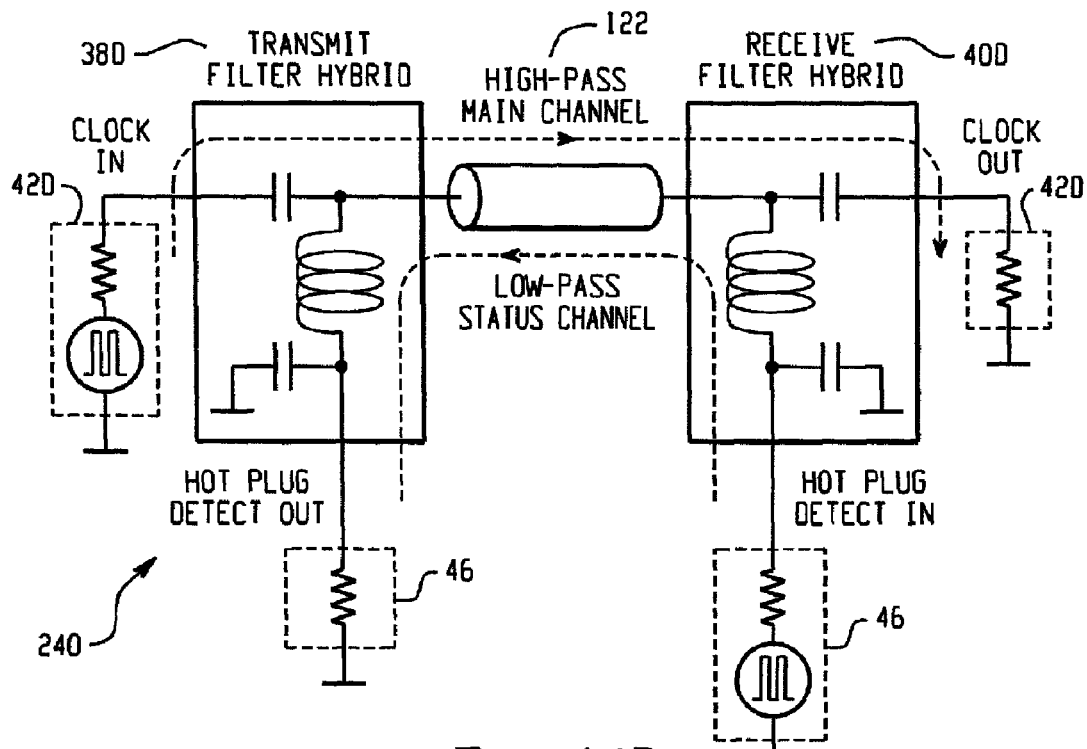
Figure 14E:
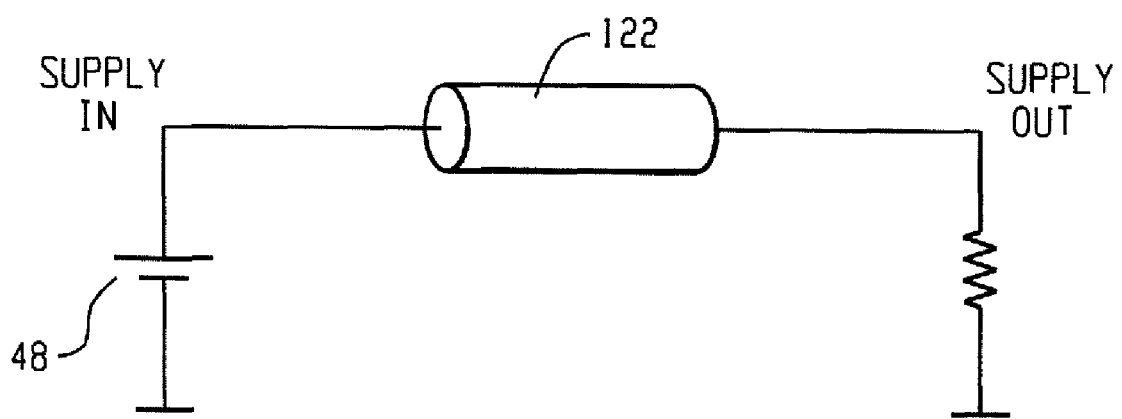

FIG. 14B is similar to FIG. 14A, but demonstrates the multiplexing and demultiplexing of the HDMI DATA1 content signal 42B and the bidirectional SCL auxiliary channel 44B. FIG. 14C demonstrates further the multiplexing and demultiplexing of the HDMI DATA0 content signal 42C and the bidirectional SDA auxiliary channel 44C. FIG. 14D demonstrates further the multiplexing and demultiplexing of the HDMI CLOCK signal 42D and the unidirectional hot-plug detect (HPD) signal 46. And FIG. 14E demonstrates the simple pass-through power channel 48.

In the above examples, the transmit and receive filters 38, 40 are identical in structure although used in opposite directions. This gives the opportunity to send and receive signals in both directions over each link and provides a hybrid of simplex and duplex links as per the requirement of the application. Each filter hybrid provides a high-pass input/output for the main channel and a low pass input/output for either one of the supply, status, or auxiliary channels. One or more band pass input/outputs may also be provided for additional multiplexing. Alternatively to the examples described above, the transmit and receive filters 38, 40 may not be identical, but instead may be specifically tailored for either the transmit or receive end of the multi-media interface, depending upon the desired application.

Figure 15A:
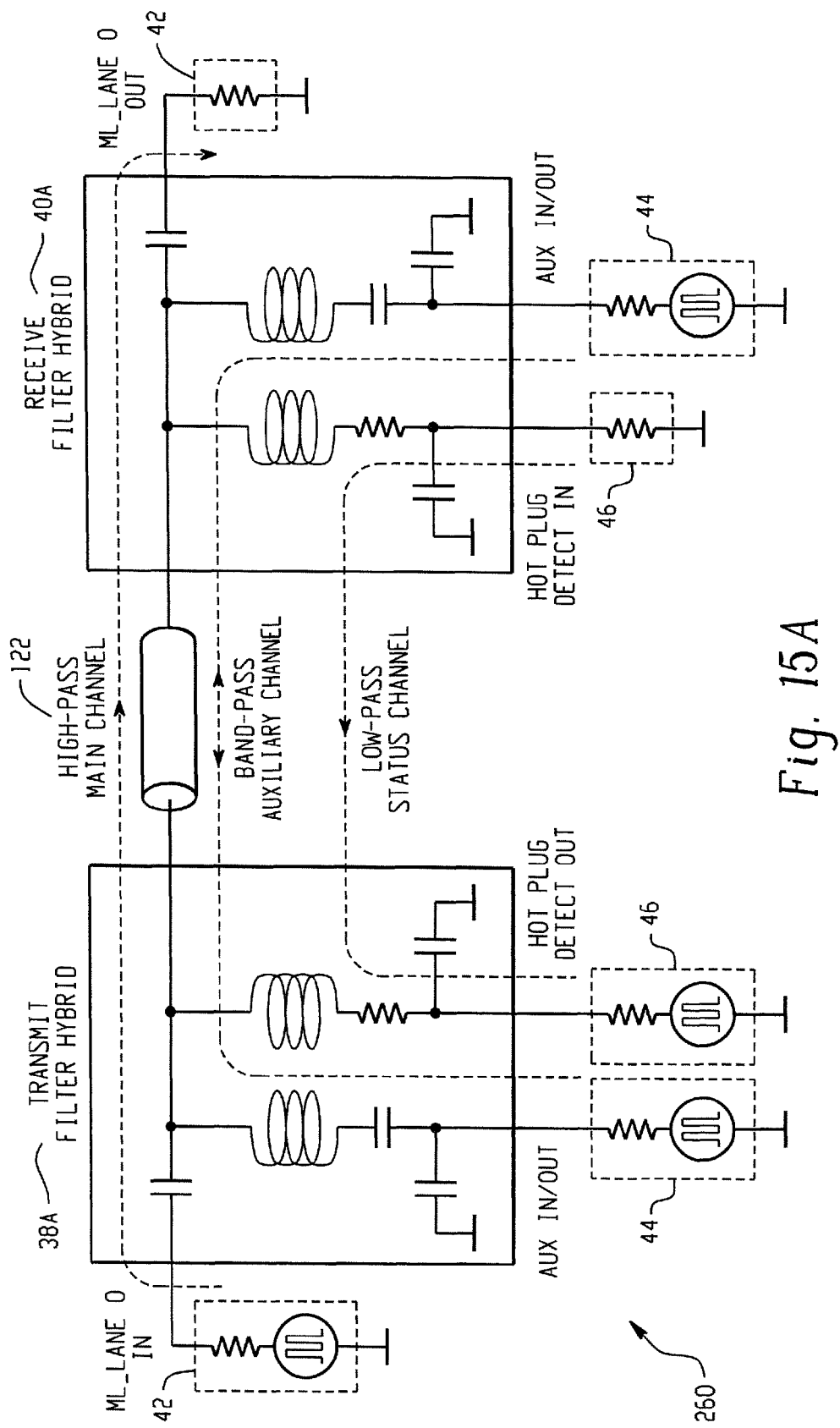
FIG. 15A is a more detailed circuit schematic of a single-channel DisplayPort interface as described with reference to FIG. 10.

FIG. 15A is a more detailed circuit schematic of a single-channel DisplayPort interface as described with reference to FIG. 10. In this interface, the transmit filter hybrid 38A includes a high pass input for receiving the single DisplayPort content channel (ML_LANE0), a band pass input for receiving the bidirectional auxiliary channel 44, and a low pass input for receiving the unidirectional HPD status channel 46. These channels are frequency multiplexed in the filter hybrid 38A into a combined signal and transported over the single medium 122 to the receive filter hybrid 40A. The receive filter hybrid 40A demultiplexes the combined signal from the single medium 122 into a high pass output (ML_LANE0) 42, a band pass output (auxiliary channel) 44, and a low pass output (which in this case is the HPD input signal from the multi-media sink) 46.

Figure 15B:
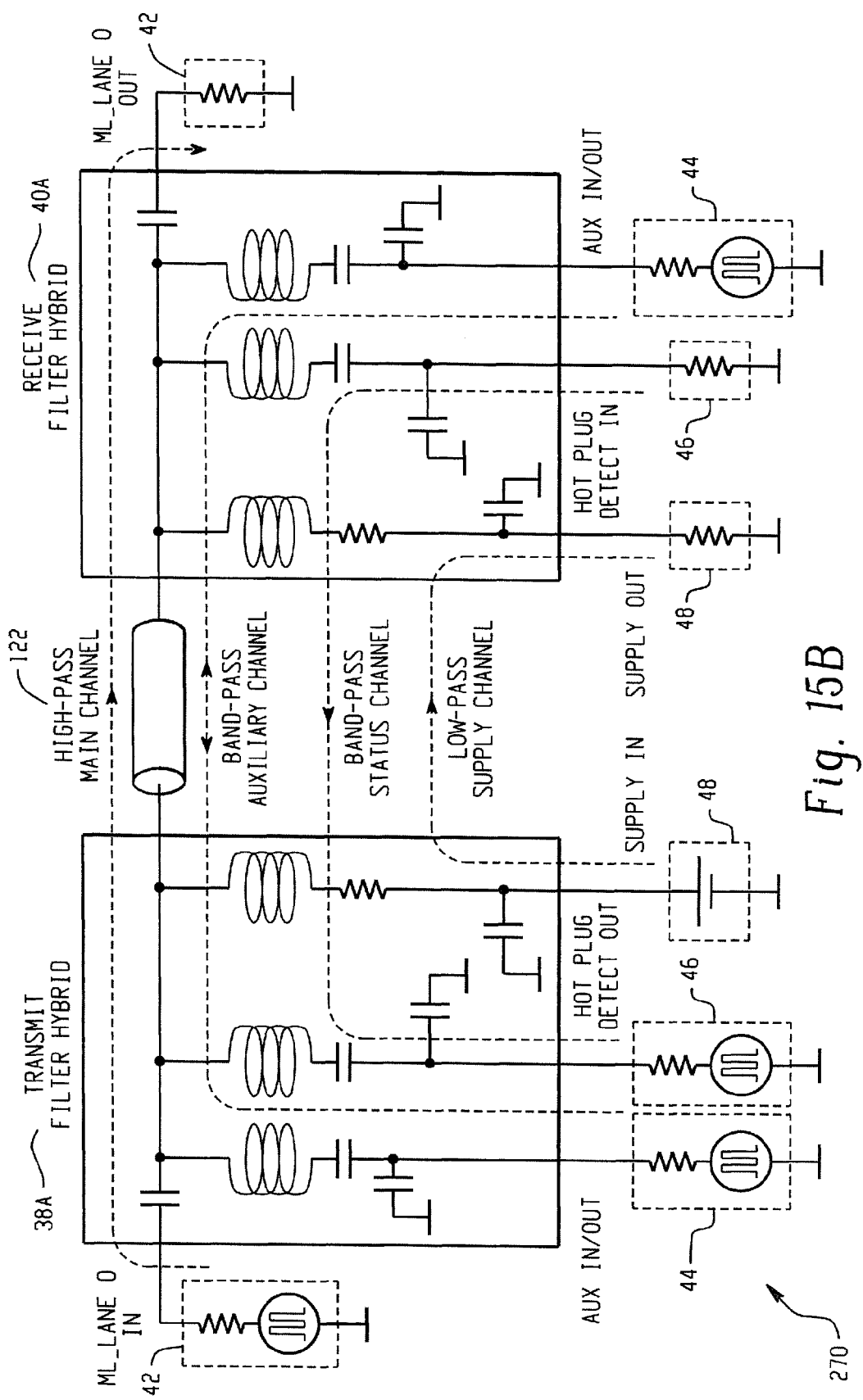
FIG. 15B is also a more detailed circuit schematic of a single-channel DisplayPort interface as described with reference to FIG. 10, but with the additional feature of transmitting power over the frequency multiplexed data channel.

FIG. 15B is also a more detailed circuit schematic of a single-channel DisplayPort interface as described with reference to FIG. 10, but with the additional feature of transmitting power over the frequency multiplexed data channel. In this configuration, the filter hybrids 38A, 40A include a high pass input, two band pass inputs, and a low pass output. The high pass circuitry passes the data channel (ML_LANE0), the first band pass circuit passes the auxiliary channel 44, the second band pass circuit passes the HPD signal 46, and the low pass circuitry passes the power channel 48.

The two above examples demonstrate single link implementations for the DisplayPort interface where only one main channel is enough to support transmission of the content. Where higher resolutions and/or higher color depths mandate inclusion of additional main channels, either further multiplexing between content channels is required or use of additional links similar to the example shown in FIG. 9.

Figure 16:
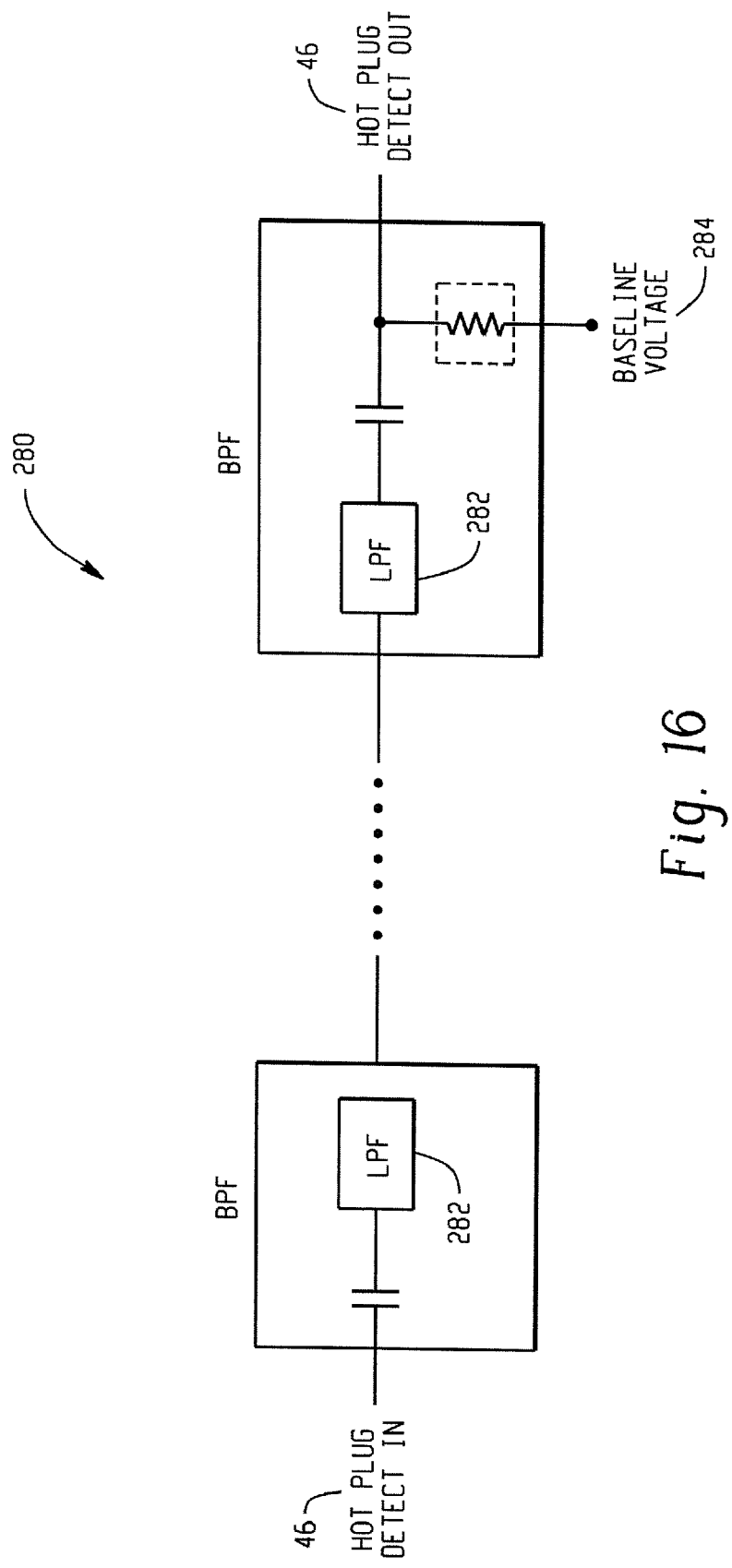
FIG. 16 is a diagram showing the concept of conditioning the hot-plug detect signal for frequency multiplexing in a band-pass status channel.

In some applications it may be necessary or desired to condition some of the signals to fit them within the assigned channel bandwidth. The hot plug detect (HPD) signal in the above "DisplayPort over single cable" case is an example of a signal that may need some manipulation. This manipulation may include some type of modulation (such as frequency modulation or shift keying) or filtering and reconstructing. The hot plug detect signal typically includes very low frequency content that may interfere with the supply channel. In this case, it may be preferable to transmit only the transitions or pulses that usually appear on top of a steady-state baseline value through the band-pass status channel and reconstruct the baseline value locally in the hot plug detect receive side. With this signal conditioning and reconstructing, the need for a low-pass channel that is typically needed to carry the hot plug detect signal is eliminated, leaving the low frequency spectrum for the supply channel. This idea is conceptually illustrated in FIG. 16, where the high-pass property of the band-pass filter, extracted via coupling capacitor, removes the low-frequency content on the transmit side. This is then reconstructed on the receive side using the baseline voltage 284.

The need for higher data rates over back channels in multimedia applications continues to increase. While the main task of a multi-media interface is to deliver high quality video and audio data from a source to a sink, in many applications, a reverse traffic of data is also required. This data could include, for example, audio information in addition to the control and status information that a sink usually communicates back to the source.

As noted above, the method for adding one or more back channel links to the main channel of a multi-media interface may be based on frequency multiplexing among several channels over a common physical medium so that the frequency separation prevents interference between different signals travelling in the same or opposite directions along the interface. As noted above, the filter hybrids may be responsible for combining different data streams on one end and separating them from each other on the other end.

Figure 17:
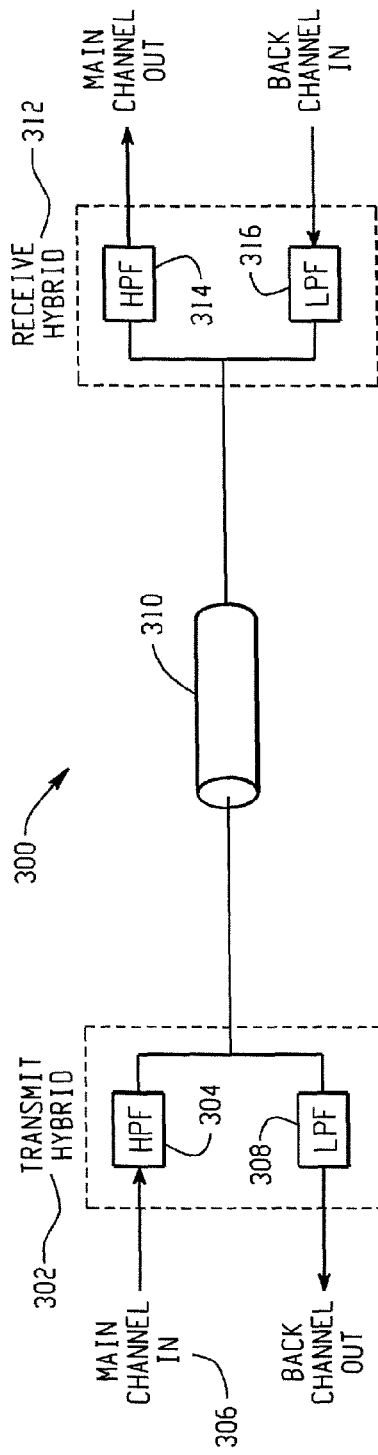
FIG. 17 is a block diagram depicting an example interface where only one back channel is being added to the main channel.

FIG. 17 depicts an interface system for coupling a first digital device with a second digital device that includes a transmit hybrid filter 302 with a high pass filter 304 for filtering main high pass channel 306 content such as multi-media content. The transmit hybrid filter 302 also includes a low pass filter 308 for filtering lower frequency back channel content such as configuration and control data. The multiple channels are combined for transmission over a transmission medium such as coaxial, twisted pair, or other cables. A receive hybrid filter 312 includes a high pass filter 314 for filtering high pass channel 306 content as well as a low pass filter 316 for filtering uncombined back channel content.

In the example interface of FIG. 17, the hybrid filter responses for the main channel are high-pass, creating a high-pass link for communication of the high data rate multi-media content in the forward direction, while the filter responses for the back channel are low-pass, enabling the use of the lower frequency band for communicating lower data rate back channel information in the reverse direction. It should be emphasized that the back channel response can be band-pass to allow the addition of other auxiliary channels. An example of an additional channel may include an implementation where the transmitter and receiver share the same power supply through the same multi-media interface. In this case, a low bandwidth low-pass response may be allocated to the power channel that dictates band-pass responses for all the other auxiliary channels.

Figure 18:
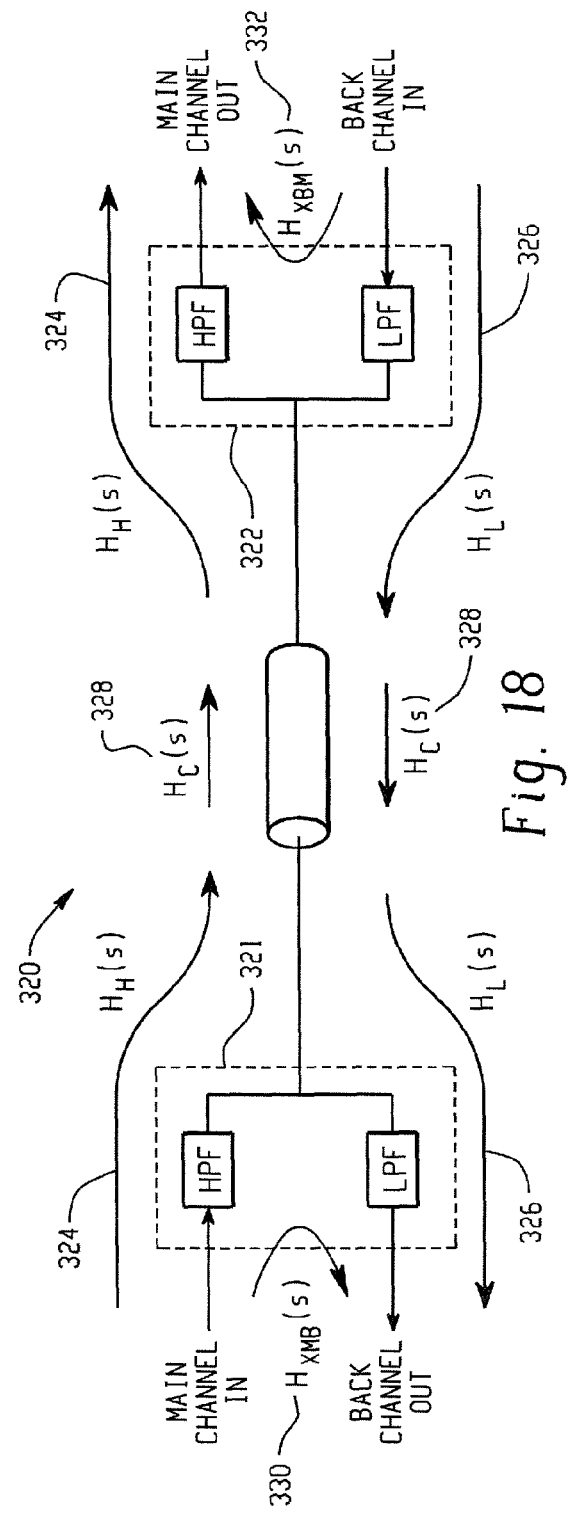
FIG. 18 is a block diagram illustrating the transfer function concept applied to different components of the link example given in FIG. 17.

Multiplexing hybrid filters may be viewed as multi-in, multi-out networks that implement different transfer functions between their various input and output pairs. FIG. 18 is a block diagram illustrating the transfer function concept applied to different components of the link example given in FIG. 17. A symmetric structure and adequate termination for the channel and filters are assumed. FIG. 18 depicts an interface system 320 that includes a transmit hybrid filter 321 and a receive hybrid filter 322 connected by a transmission medium. A transfer function for the high-pass filters, $H_H(s)$ is depicted at 324, with a low-pass filter transfer function $H_L(s)$ being depicted at 326 and a transmission medium (channel) transfer function being depicted as $H_C(s)$ at 328. Also depicted is a cross-talk transfer function $H_{XMB}(s)$ from the main channel to the back channel at 330 and a cross-talk transfer function $H_{XBM}(s)$ from the back channel to the main channel at 332.

A major cause of interference between the main and back channels is non-zero transfer functions between the cross coupling ports of the hybrid filters. For example, $H_{XBM}(s)$ 332 represents the cross-talk to the main channel received signal caused by the back channel transmitter. Similarly, $H_{XMB}(s)$ 330 represents the cross-talk added to the back channel received signal by the main channel transmitter. Note that in the above figure $H_H(s)$ 324, $H_L(s)$ 326, and $H_C(s)$ 328 represent the transfer functions of the high-pass filter, the low-pass filter, and the transmission medium, respectively.

Additional transmit and receive filters may be employed to implement more efficient spectral shaping over a channel so that the interference between the main channel and the back channel are reduced. Furthermore, near-end cross-talk cancellation filters may be included on each end of the link to further reduce the cross-talk. The transmit and receive filters are discussed first below for proper signal shaping on the back channel. The discussion will then turn to the cross-talk cancellation filters and an illustration of how these filters may significantly reduce the interference.

Figure 19:
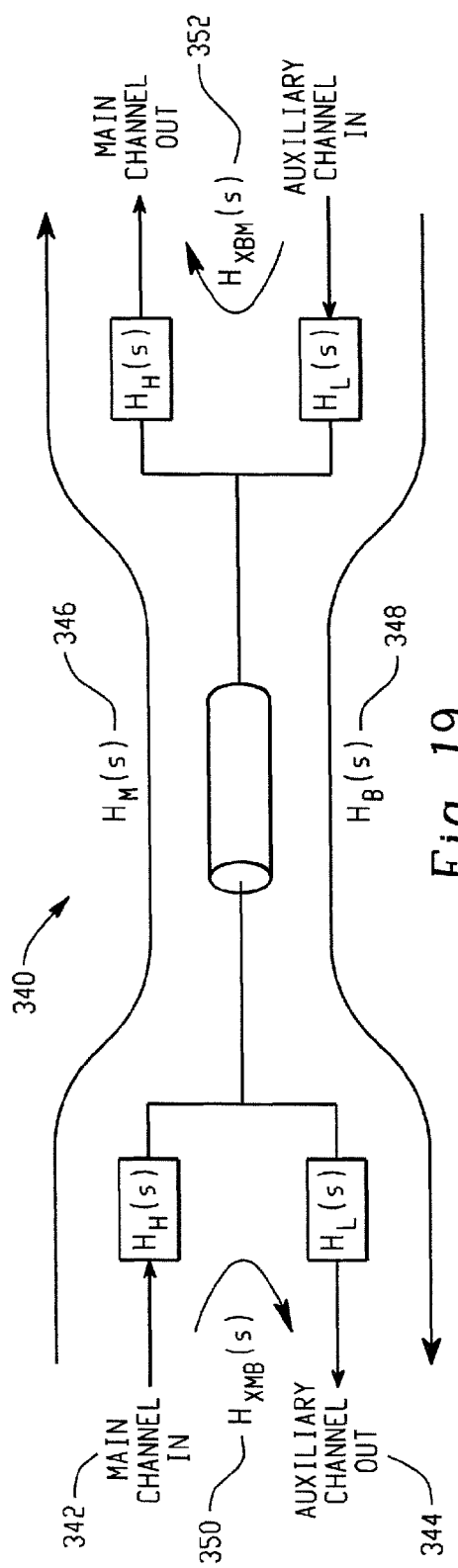
FIG. 19 is a block diagram depicting a multi-media interface composed of a forward main channel and a reverse back channel.

FIG. 19 is a block diagram depicting a multi-media interface composed of a forward main channel 342 and a reverse back channel 344. The overall channel transfer functions as well as the cross-talk transfer functions are specified, with $H_M(s)$ 346 depicting the main channel transfer function, $H_B(s)$ 348 depicting the back channel transfer function, $H_{XMB}(s)$ 350 depicting the cross-talk transfer function from the main channel 342 to the back channel 344, and $H_{XBM}(s)$ 352 depicting the cross-talk transfer function from the back channel 344 to the main channel 342.

In FIG. 19, the overall main channel transfer function, $H_M(s)$, and the overall back channel transfer function, $H_B(s)$, may be expressed in terms of the hybrid filter transfer functions and the channel response components shown in FIG. 18:

$$H_M(s)=H_H(s) \cdot H_C(s) \cdot H_H(s)$$

$$H_B(s)=H_L(s) \cdot H_C(s) \cdot H_L(s) \qquad \text{Equation 1.}$$

Figure 20:
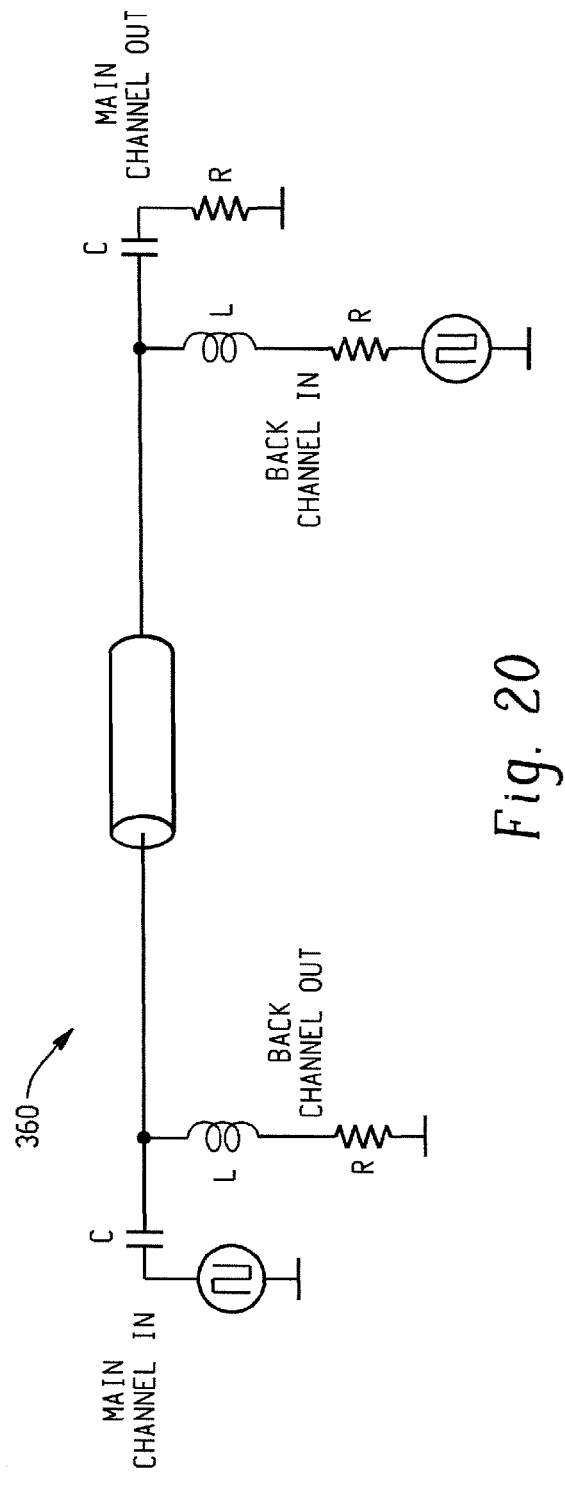
FIG. 20 depicts an example implementation of the FIG. 19 interface.
Figure 21:
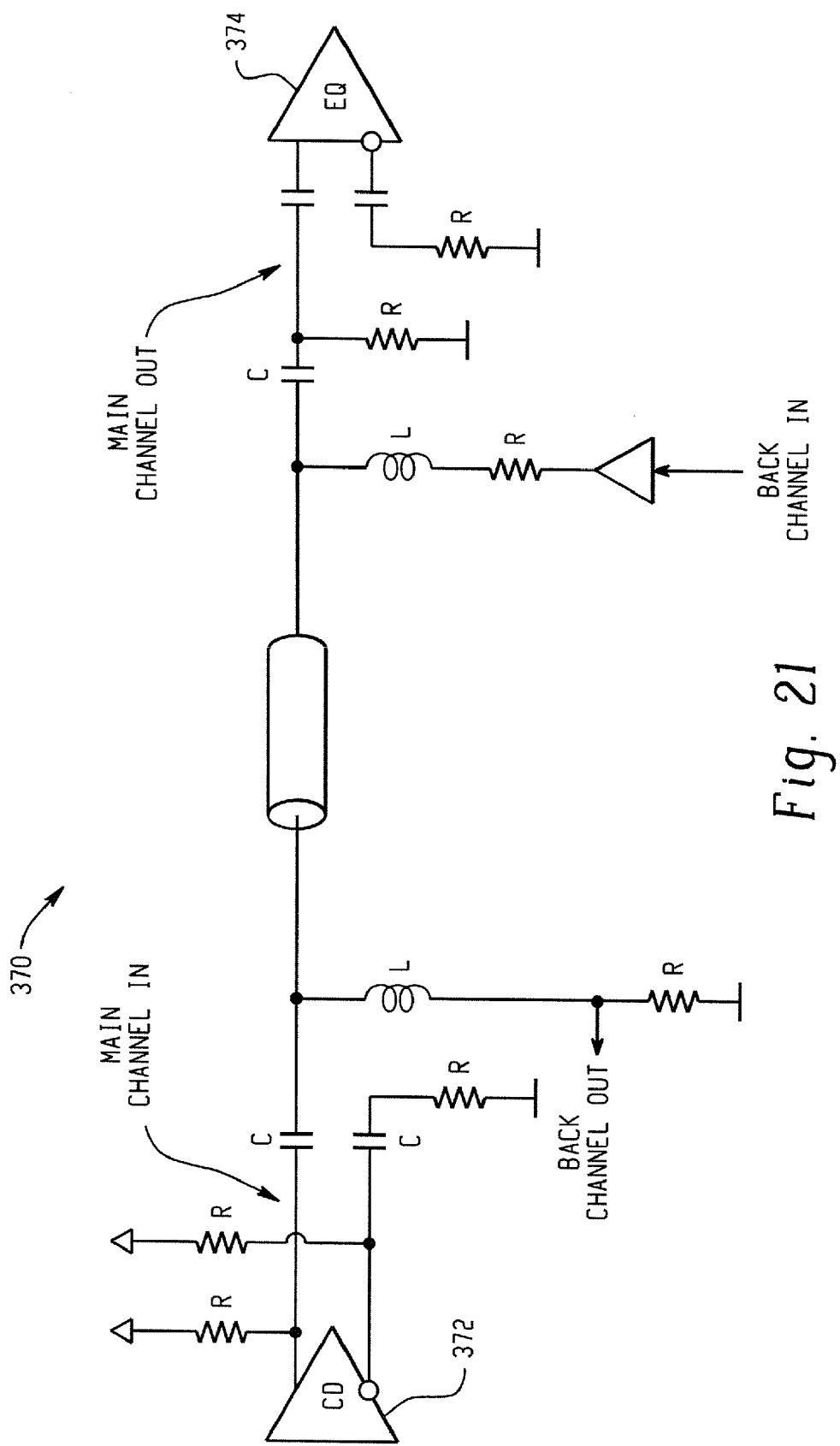
FIG. 21 illustrates a practical implementation of FIG. 20.

FIG. 20 depicts an example implementation 360 of the above described interface. FIG. 20 includes a single ended signalling scheme and a copper medium such as a coaxial cable. The filter hybrids are realized by RLC circuits that are designed to implement the desired transfer functions, while providing adequate matching to the characteristic impedance of the cable. FIG. 21 illustrates a practical implementation of FIG. 20 in which a cable driver 372 with complementary outputs and a cable equalizer 374 with differential inputs are used to serve as the main channel source and receiver front ends, respectively. Because the medium is single ended, the complementary output and input terminals of the driver and receiver are not used and only terminated by necessary termination circuits. The AC coupling capacitors at the equalizer input are only used to isolate the DC biasing voltage of the equalizer input stage from the medium and are not considered to be a part of the filter.

The transfer functions realized by the FIG. 20 and FIG. 21 implementations are:

$$H_M(s) = \frac{R^2C^2s^2}{(1+RCs)^2} \cdot C(s)$$

$$H_{XMB}(s) = \frac{RCs}{(1+RCs)^2}$$

$$H_B(s) = \frac{1}{(1+RCs)^2} \cdot C(s)$$

$$H_{XBM}(s) = \frac{RCs}{(1+RCs)^2}.$$

Equation 2

Known methods may be used to calculate the component values to achieve a desired cut-off frequency that separates the main channel from the back channel and at the same time provide matched termination to the characteristic impedance of the medium. For example, R=75Ω, C=212 pF, and L=1.19 µH achieve a 10 MHz cut-off frequency and a 75Ω termination impedance. FIGS. 22A-22D illustrate the corresponding frequency responses of the above transfer functions, where the frequency axis is normalized to the cut-off frequency (e.g., 1 Hz represents 10 MHz for the above numerical example). Here, C(s)=1 is arbitrarily assumed for simplicity.

Figure 22A:
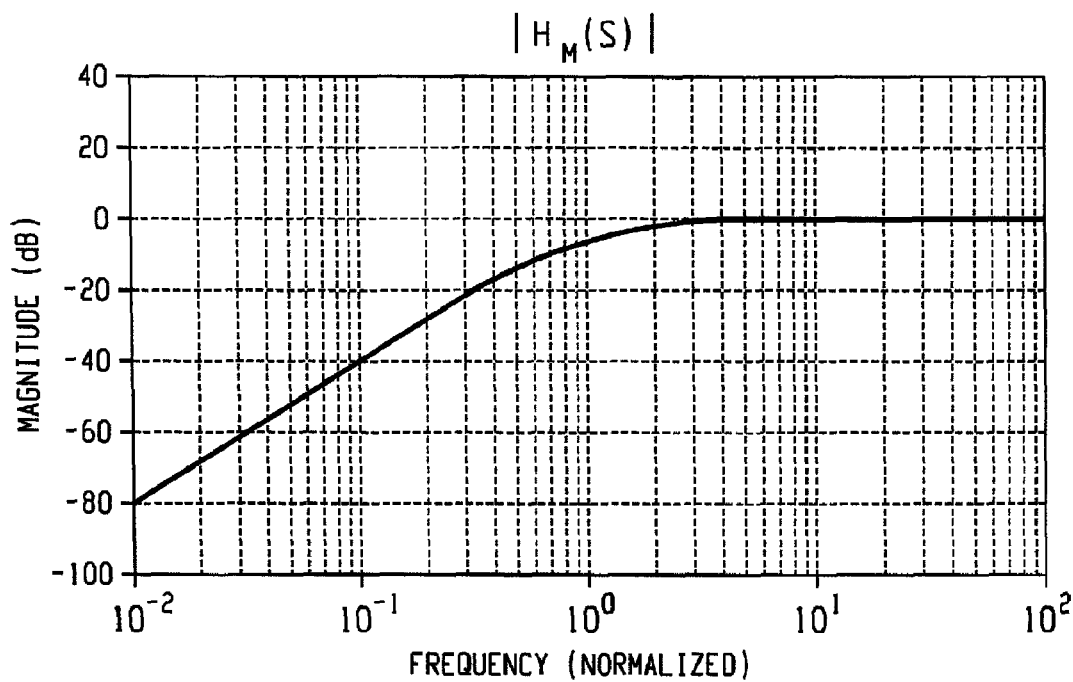
FIGS. 22A-22D illustrate the corresponding frequency responses of the FIG. 21 transfer functions, where the frequency axis is normalized to the cut-off frequency.
Figure 22B:
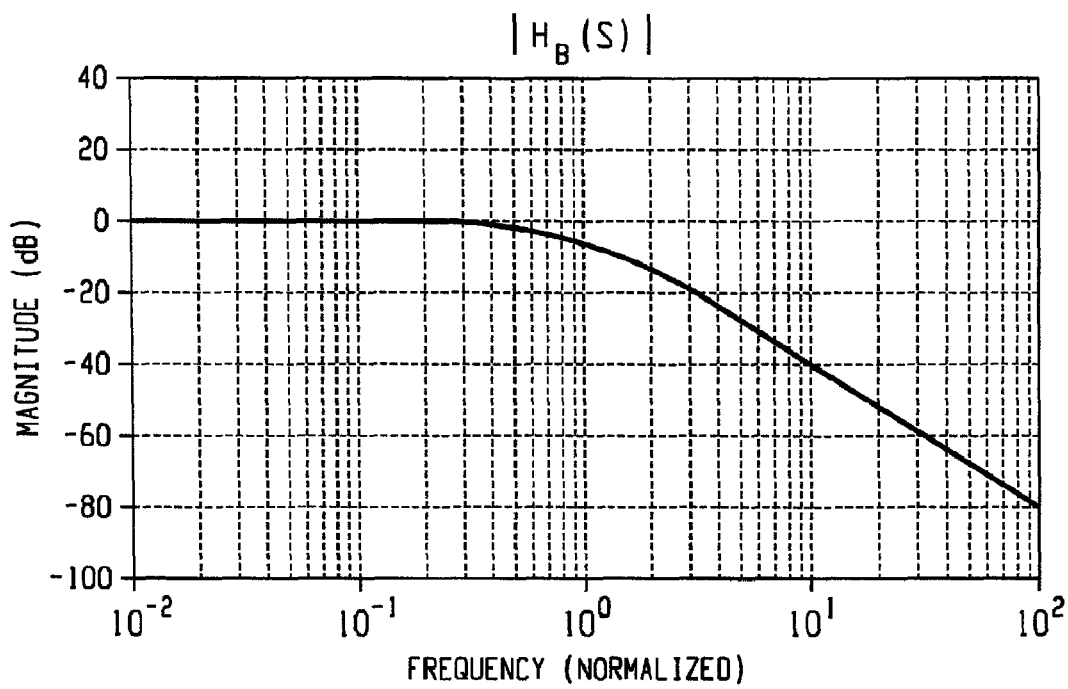
Figure 22C:
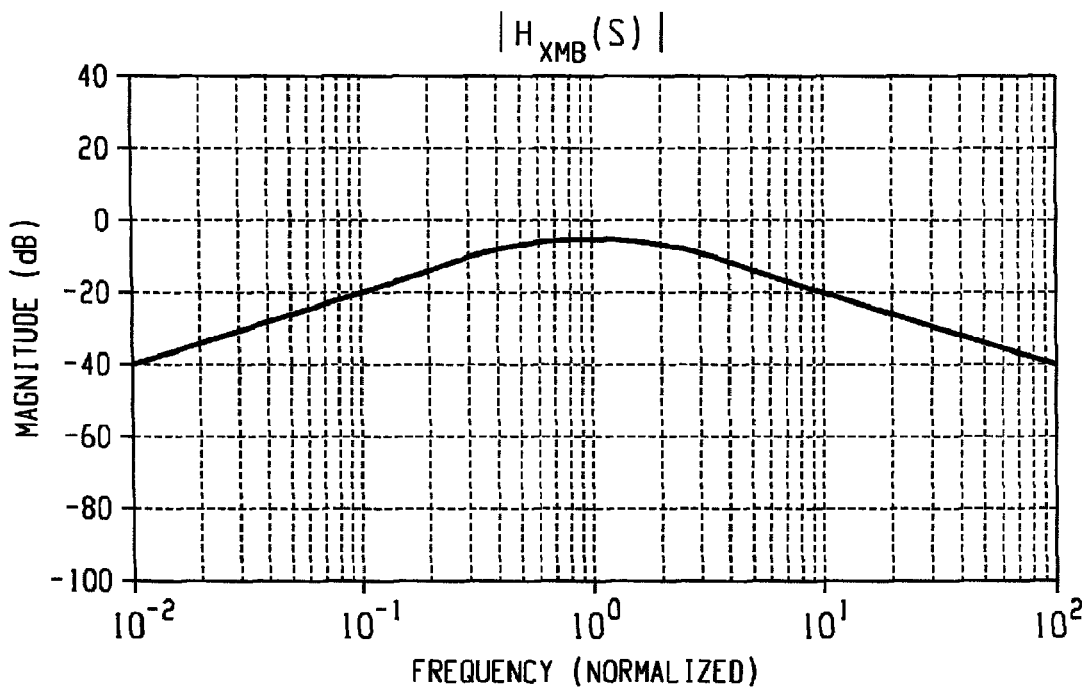
Figure 22D:
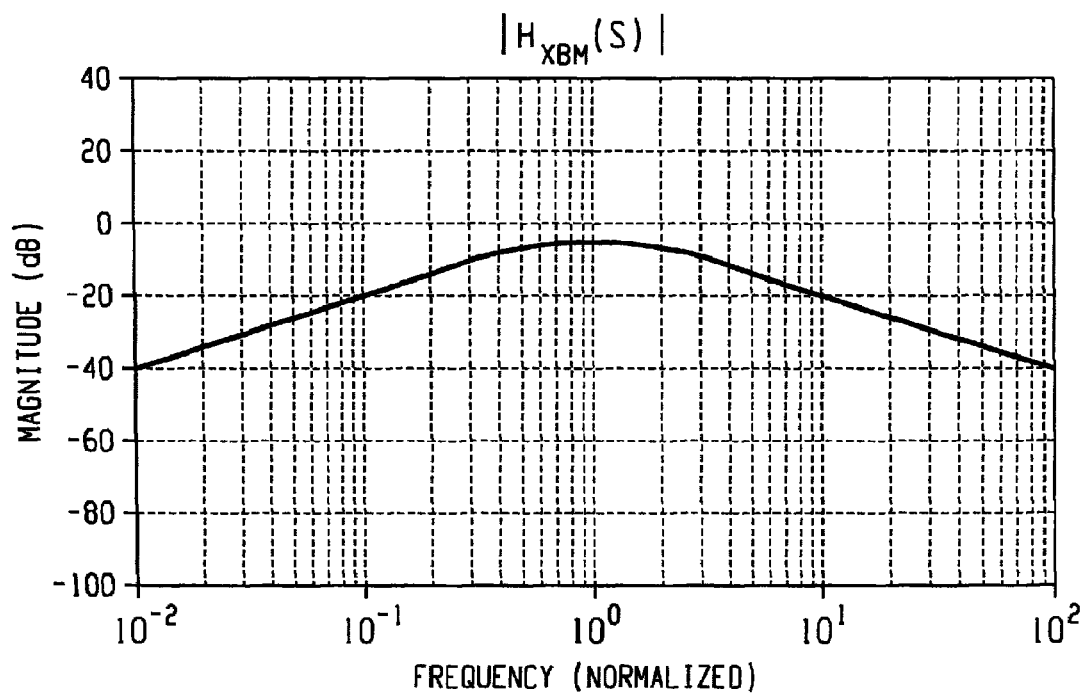

As may be seen by the frequency responses depicted in FIGS. 22A-22D, the main channel transfer function implements a second order high-pass filter in FIG. 22A, the back channel transfer function implements a second order low-pass filter in FIG. 22B, and each of the cross-talk transfer functions implements a second order band-pass filter as depicted in FIGS. 22C-22D.

FIGS. 22A-22D clearly illustrate the amount of cross-talk that occurs between the main channel and the back channel through the hybrid filters. FIGS. 22C-22D illustrate that cross-talk transfer peaks may be as high as −6 dB at the cut-off frequency. This means that any frequency component that exists at this frequency on the transmit side of either channel will be injected to the receive side of the other channel with only 6 dB of attenuation. Although the idea of frequency multiplexing may assume negligible overlap between the frequency contents of the main and back channel signals, in many practical applications these signals may include considerable energy around the cut-off frequency of the hybrid filters. In these cases, the use of additional filtering on both or either sides of both or either channels may be helpful. These filters often act as additional high-pass filters on the main channel and low-pass filters on the back channel. For performance reasons, the use of additional filtering on the main channel may be excluded to avoid introducing more components into the high frequency signal path and consequently more parasitic effects. Adding more low-pass filtering to the back channel, however, may be more practical as this channel operates at a lower frequency band.

One possibility for the transmit filter is to have a low-pass response with a more efficient out-of-band rejection than that of the channel filter. This may imply a lower cut-off frequency than that of the channel response, although there may be cases where the out-of-band rejection comes from the sharper attenuation characteristic of the transmit filter and not necessarily its lower cut-off frequency. In these cases, the transmit cut-off frequency may not be restricted to be smaller than that of the channel.

Figure 23:
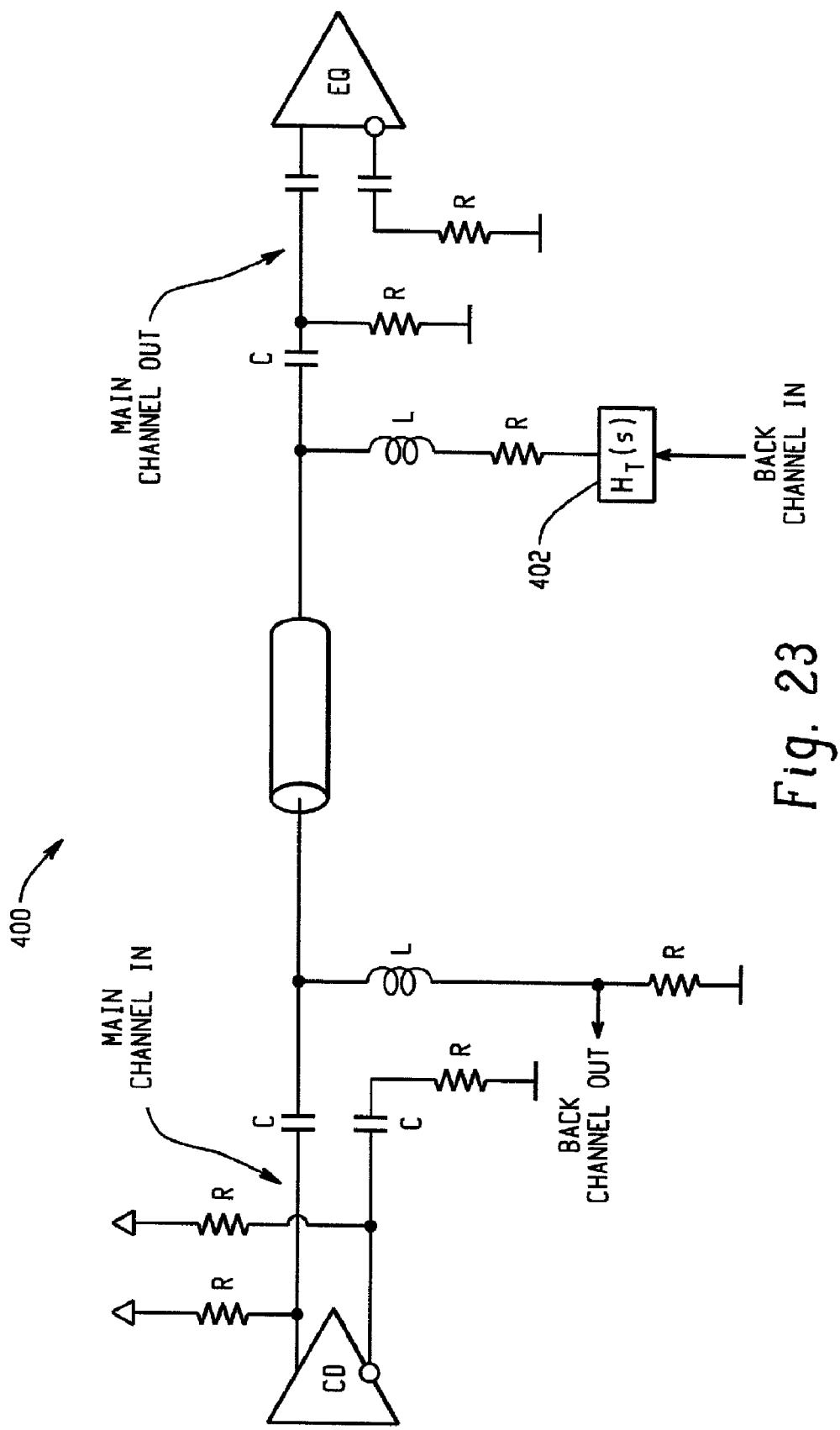
FIG. 23 is a block diagram of the example of FIG. 21 with the addition of a transmit filter $H_T(s)$.

FIG. 23 is a block diagram of the example of FIG. 21 with the addition of a transmit filter $H_T(s)$ 402. With the addition of the transmit filter, the realized transfer functions change to:

$$H_M(s) = \frac{R^2C^2s^2}{(1+RCs)^2} \cdot C(s)$$

$$H_{XMB}(s) = \frac{RCs}{(1+RCs)^2}$$

$$H_B(s) = \frac{1}{(1+RCs)^2} \cdot C(s) \cdot H_T(s)$$

$$H_{XBM}(s) = \frac{RCs}{(1+RCs)^2} \cdot H_T(s).$$

Equation 3

It should be understood that the design of the transmit filter is a choice of the designer based on the application requirement. As an example, a second-order filter with a cut-off frequency smaller than the cut-off frequency of the channel may be considered.

Figure 24A:
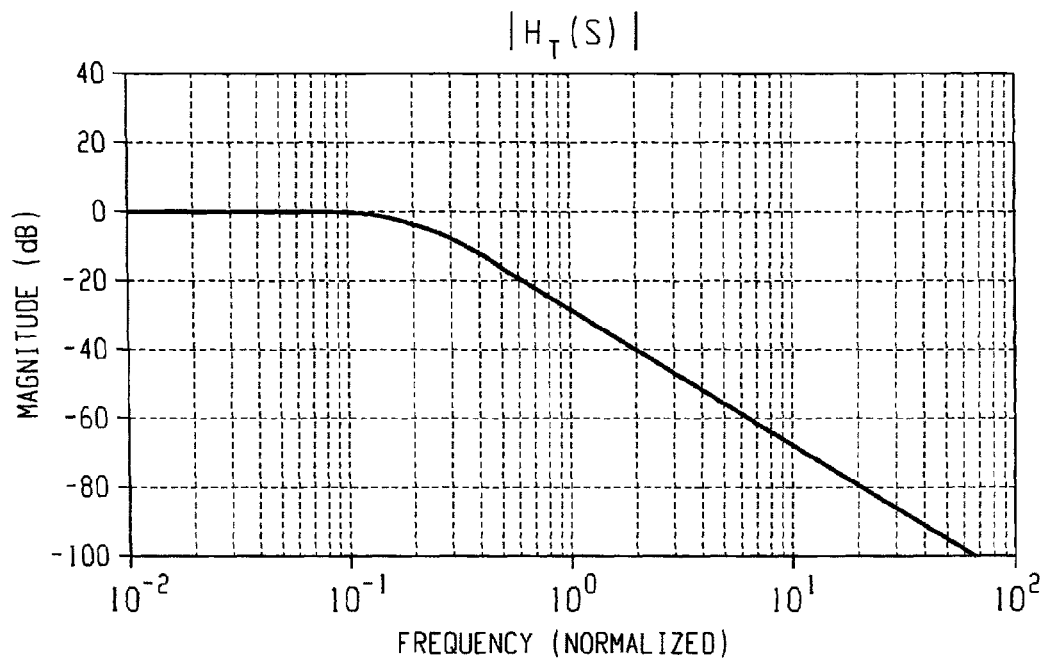
FIGS. 24A-24C illustrate the transmit filter response of the FIG. 23 implementation, along with the affected transfer functions.
Figure 24B:
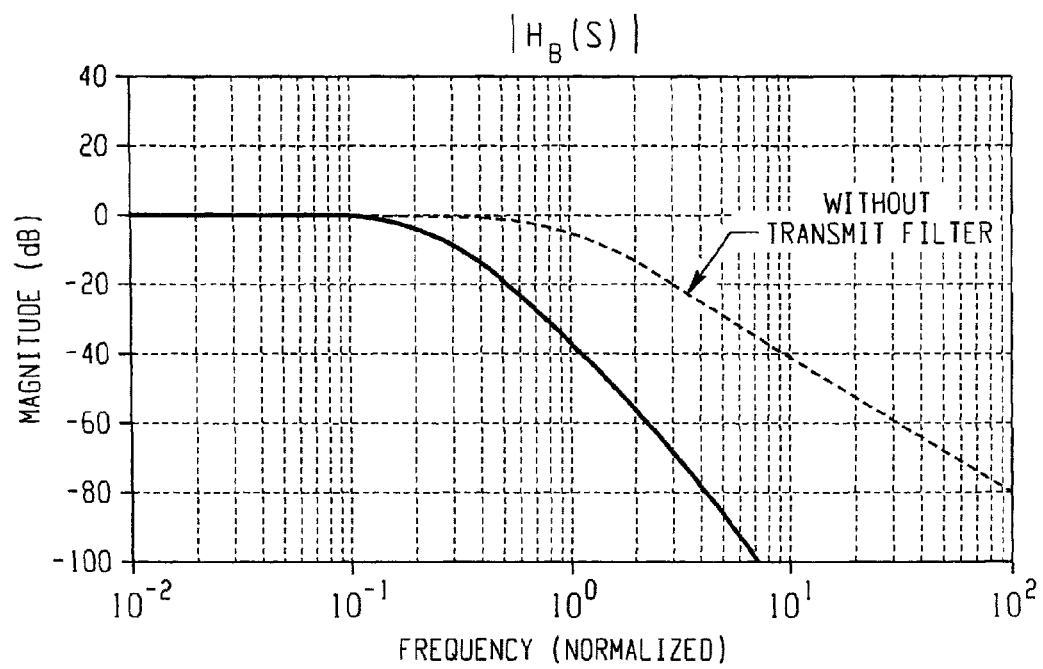
Figure 24C:
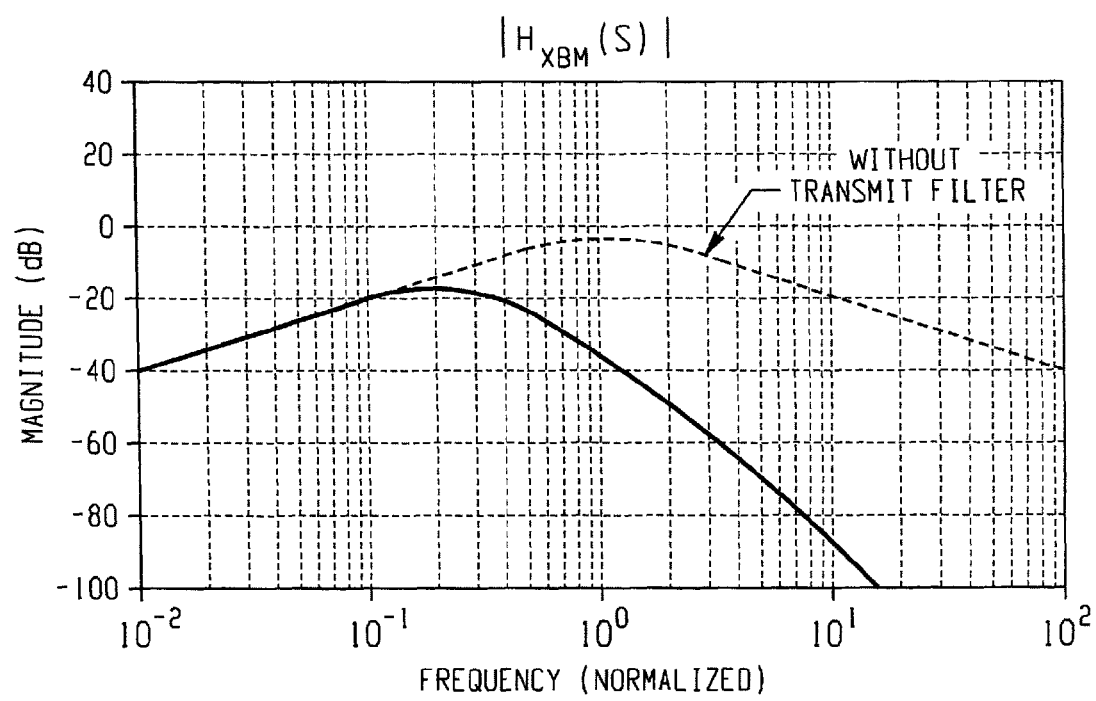

FIG. 24 illustrates the transmit filter response in this case in FIG. 24A along with the resulting frequency responses of the back channel transfer function, $H_B(s)$, in FIG. 24B, and the back channel to main channel cross-talk transfer function, $H_{XBM}(s)$, in FIG. 24C, that are affected by the addition of the transmit filter. The original responses of these latter transfer functions are also included in FIGS. 24B-24C from FIGS. 22B-22C, respectively, in thin lines for reference. As may be seen, the introduction of the transmit filter may considerably reduce the cross-talk from the back channel transmitter to the main channel receiver.

Figure 25:
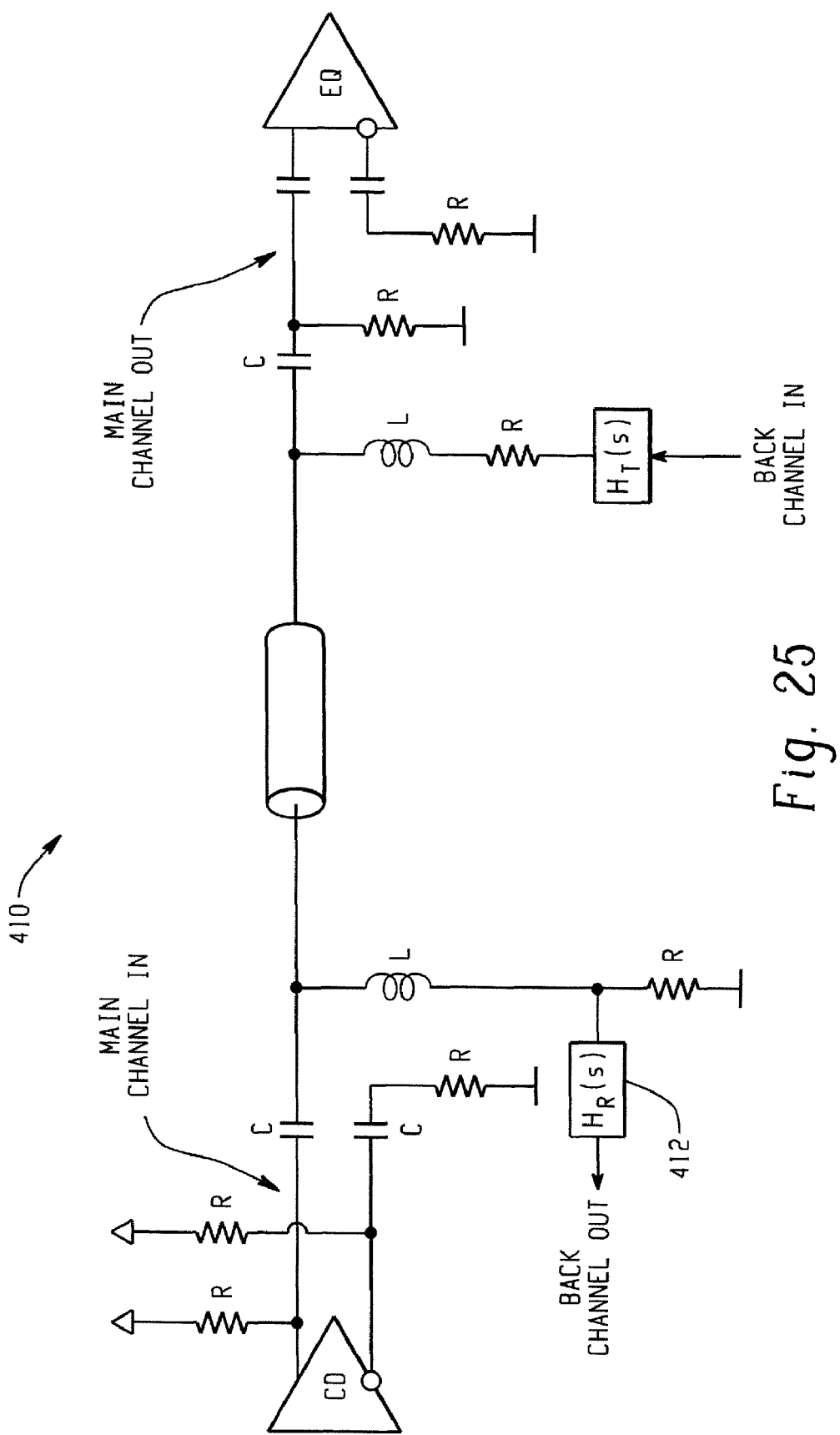
FIG. 25 illustrates the example of FIG. 23 with the addition of the back channel receive filter, $H_R(s)$.

The introduction of the transmit filter to reduce the cross-talk may come with a price of further band limiting the back channel. This would mean that either a lower data rate may be transmitted through the back channel, or a back channel equalizing filter may be needed on the receive end of the back channel to equalize for the additional loss. The transmit filter loss may be compensated by the back channel receive filter. FIG. 25 illustrates the same example of FIG. 23 with the addition of the back channel receive filter, $H_R(s)$ 412.

Consequently, in the presence of both the transmit and receive filters, the transfer functions become:

$$H_M(s) = \frac{R^2C^2s^2}{(1+RCs)^2} \cdot C(s)$$

$$H_{XMB}(s) = \frac{RCs}{(1+RCs)^2} \cdot H_R(s)$$

Equation 4

$$H_B(s) = \frac{1}{(1+RCs)^2} \cdot C(s) \cdot H_T(s) \cdot H_R(s)$$

$$H_{XBM}(s) = \frac{RCs}{(1+RCs)^2} \cdot H_T(s).$$

Similar to the transmit filter, the design of the back channel receive filter is also a choice of the designer based on the application requirements. A common approach is based on compensating the signal losses incurred throughout the transmission channel. This may, for example, include the additional loss due to the transmit filter as well as the losses imposed by the transmission medium. Because the back channel is a relatively low bandwidth channel, a mild equalization may suffice to compensate for any losses.

Figure 26A:
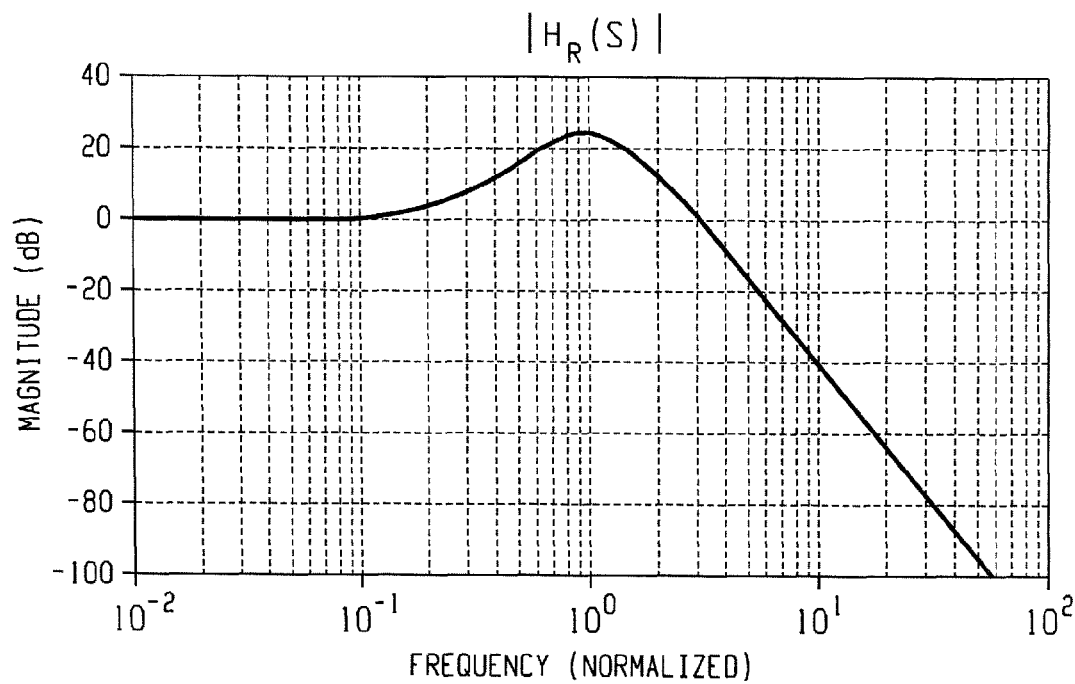
FIGS. 26A-26C depict an example back channel receive filter frequency response that is designed to equalize signal loss caused by the transmit filter response shown in FIG. 24, along with the affected transfer functions.
Figure 26B:
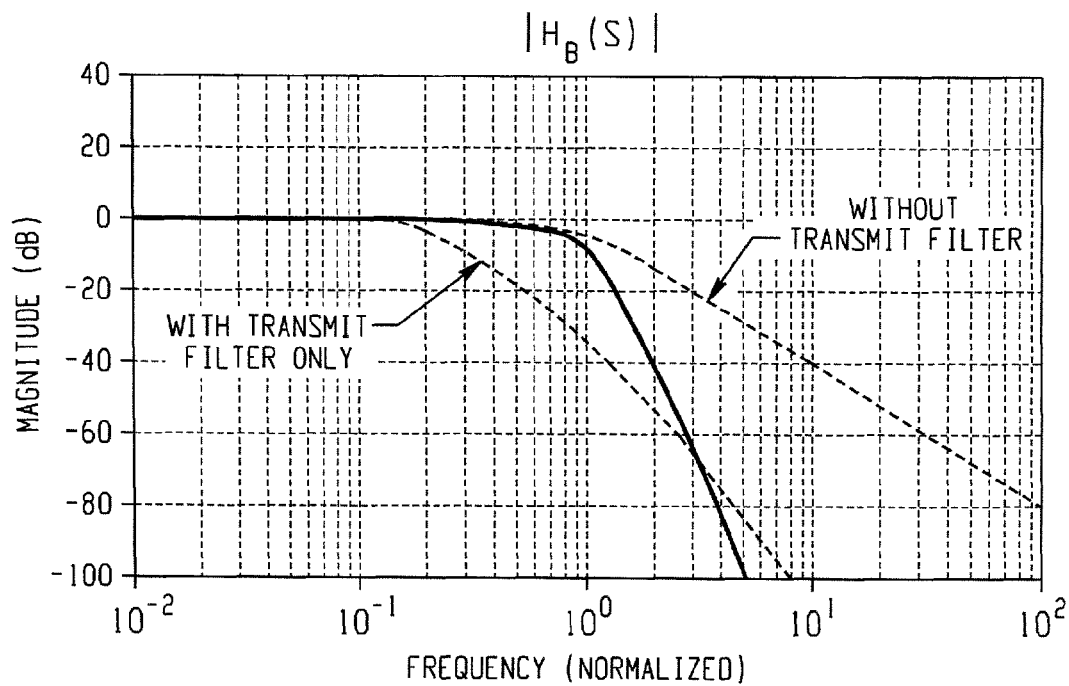
Figure 26C:
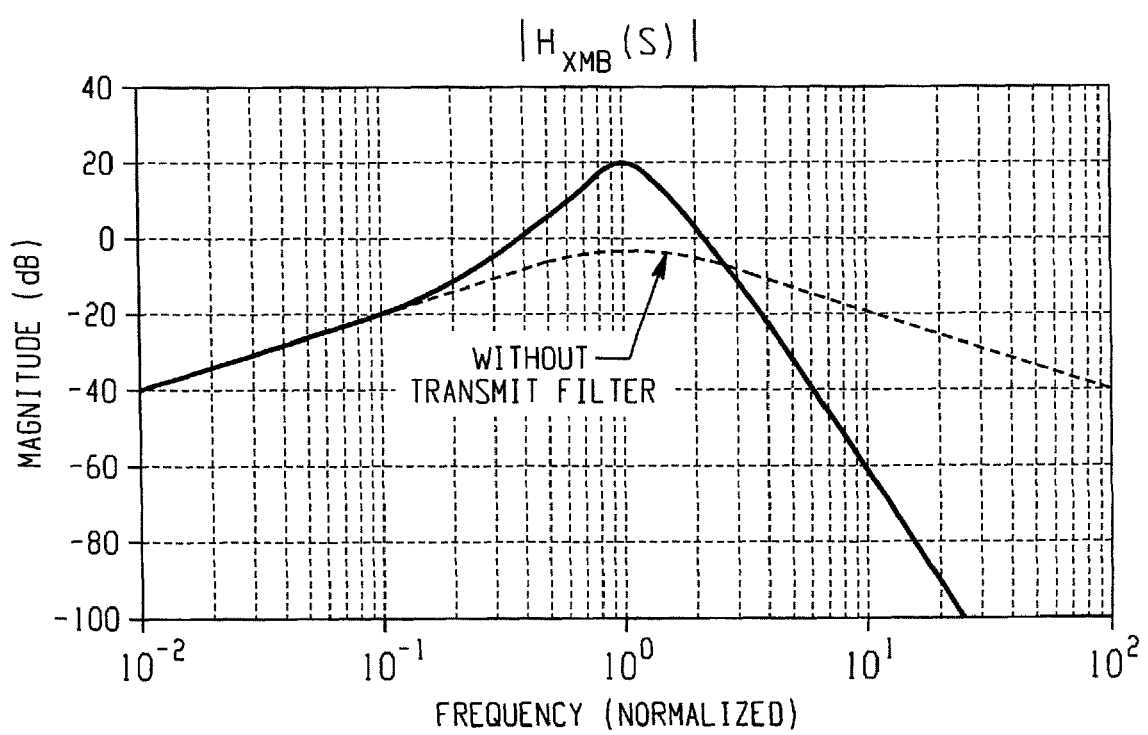

FIGS. 26A-26C depict an example back channel receive filter frequency response that is designed to equalize signal loss caused by the transmit filter response shown in FIG. 24. Note that in practice, the receive filter may be modified to compensate the transmission medium loss and is usually band limited to the maximum required back channel bandwidth to reject out-of-band noise. Because a lossless medium has been assumed, the receive filter response in FIG. 26A does not include any medium equalization. The receive filter does, however, implement some additional out-of-band attenuation for the reason mentioned above. Also shown in FIGS. 26B-26C, are the frequency responses of the back channel transfer function, $H_B(s)$, and the main channel to back channel cross-talk transfer function, $H_{XMB}(s)$, respectively, that are affected by the receive filter. The previously described responses of these transfer functions are shown in thin lines for reference.

The introduction of the equalizing receive filter may result in an increase in the amount of the cross-talk from the main channel transmitter to the back channel receiver. This increase is caused by the frequency boost implemented by the equalizer that is designed to compensate for the overall back channel losses. This boost may be useful in recovering the back channel bandwidth in the presence of a lower bandwidth imposed by the transmit filter. In applications where this level of cross-talk is not acceptable, either no or little frequency boost equalization may be used or another method be employed. Because removing the equalization function from the receiver results in lowering the overall bandwidth of the back channel, other methods may be used to prevent this penalty.

In some applications where the transmitter of either one of the main and back channels is physically located close to the receiver of the other channel, it is possible to effectively cancel the cross-talks between the channels (e.g., reduce cross-talk by >90%). These cross-talks are caused by the hybrid filters that are responsible for combining and splitting the signals on the two ends of the interface. On the receive side of the main channel, the addition of the cross-talk cancellation filter may be particularly important because full attempt is usually made to minimize the performance penalty on the multi-media content in the presence of the additional back channel. Furthermore, and despite the possible argument that the performance of the back channel may not be as crucial as the main channel, the addition of the cross-talk cancellation filter to the receive side of the back channel is useful if the additional cross-talk amplification by the back channel equalizing receive filter, as discussed above, proves to be problematic for the proper and acceptable operation of the back channel. The choice of employing cross-talk cancellation filters on either or both sides of the interface depends on the application requirements and may be made independent of one another. The ultimate decision in using neither, one, or both of these filters is one to be made depending on the system requirements.

Figure 27:
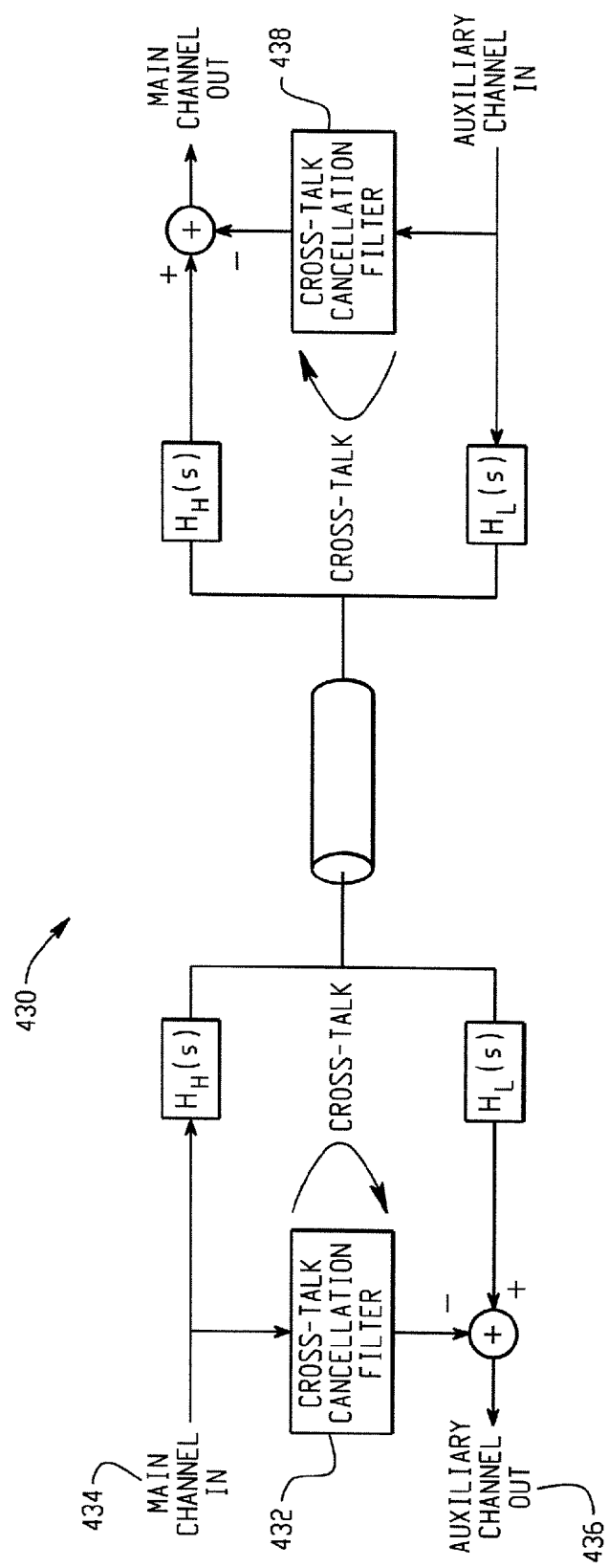
FIG. 27 is a block diagram depicting cross-talk cancellation.

The concept of cross-talk cancellation is based on passing the aggressor signal through a transfer function that is matched to the cross-talk transfer function. This signal may then be subtracted from the received signal of the victim channel. The subtraction may be implemented in different ways, including, but not limited to, using opposite polarities of the aggressor signal at the source and differential input of the receiver at the sink. FIG. 27 is a block diagram depicting this cross-talk cancellation. FIG. 27 includes a first cross-talk filter 432 for subtracting cross-talk effects emanating from the main channel 434 to the auxiliary (back) channel 436 as well as a second cross-talk filter 438 for subtracting cross-talk effects emanating from the auxiliary channel 436 to the main channel 438.

Figure 28:
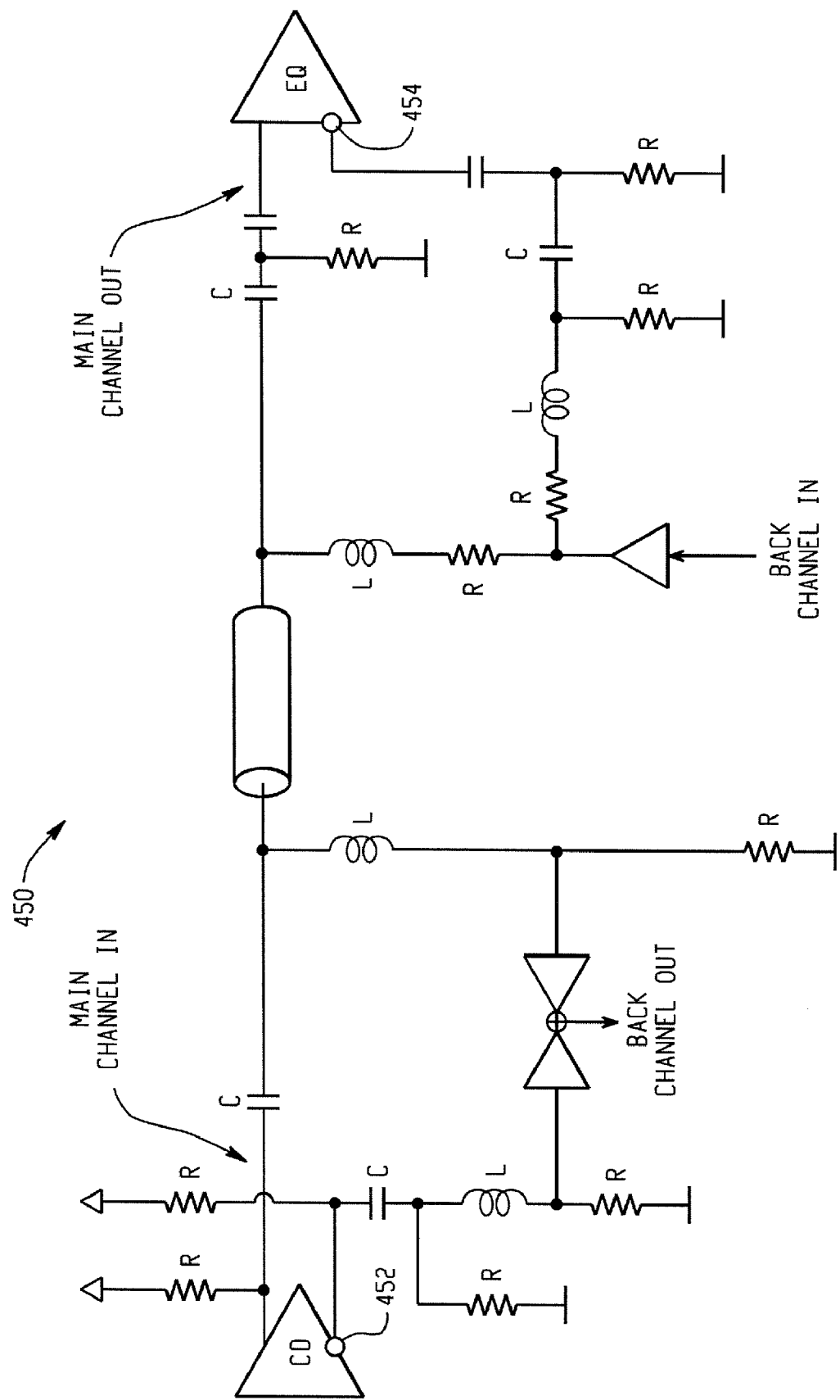
FIG. 28 shows the interface of FIG. 21 with the cross-talk cancellation filters added.

Given a filter hybrid for back channelling, the cross-talk cancellation filters may then be designed. FIG. 28 shows the interface of FIG. 21 with the cross-talk cancellation filters added. In this implementation, the fact that the main source has a complementary output 452 that was not used previously and that the main sink has a differential input 454 that was not fully utilized previously is taken advantage of to implement the subtractions needed in realizing the cross-talk cancellation filters.

The transfer functions realized by the cross-talk cancellation filters in FIG. 28 are indeed identical to the cross-talk transfer functions in FIG. 21, as given by Equation 2, resulting in the removal of cross-talk and the following overall transfer functions for the circuit of FIG. 28:

$$H_M(s) = \frac{R^2 C^2 s^2}{(1+RCs)^2} \cdot C(s) \qquad \text{Equation 5}$$

$$H_{XMB}(s) = 0$$

$$H_B(s) = \frac{1}{(1+RCs)^2} \cdot C(s)$$

$$H_{XBM}(s) = 0.$$

Figure 29:
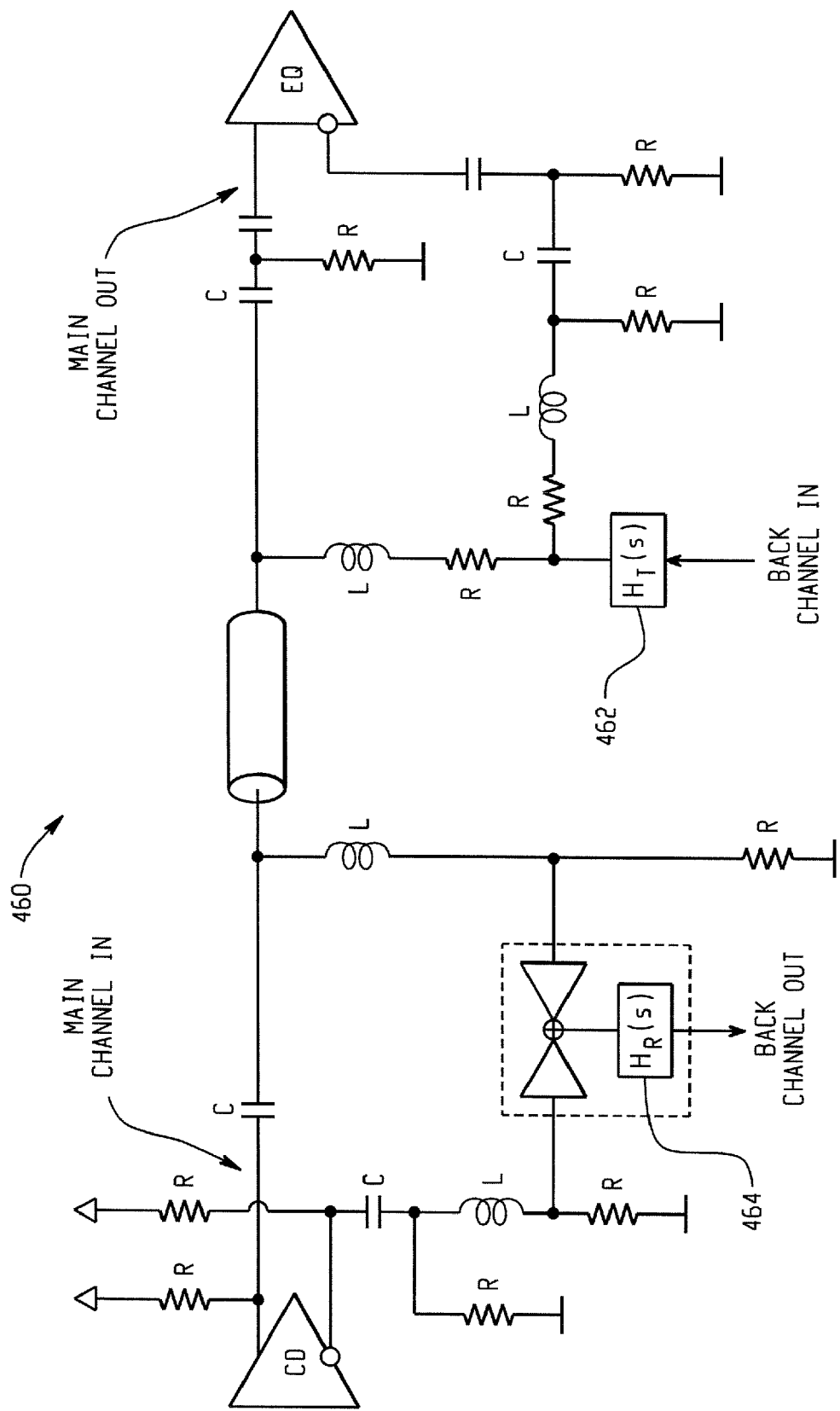
FIG. 29 shows the FIG. 28 implementation with both the transmit and receive filters added.

Once the cross-talk cancellation filters are in place, a decision may be made as to whether to employ both or either one of the back channel transmit and receive filters or not. Depending on the ability of the cross-talk cancellation filters to cancel the cross-talks (which in practice is limited by imperfections such as mismatches), the bandwidth constraint on the transmit filter may be relaxed by widening the constraint or even adding some amount of pre-emphasis to combat the frequency dependent signal loss during transmission. In such a case, the equalization requirement of the receive filter may be reduced or even removed. Alternatively, a more proper split between pre-emphasis on the back channel transmit side and equalization on the receive side may be implemented, based on the application requirements and if the designer chooses so. FIG. 29 shows the FIG. 28 implementation with both the transmit 462 and receive 464 filters added. This configuration gives flexibility to the designer to decide which and what filters to use to meet the system requirements and at the same time minimize the implementation complexity and achieve an overall optimum solution.

The transfer functions realized by the circuit implementation of FIG. 29 may be given by the following equation:

$$H_M(s) = \frac{R^2 C^2 s^2}{(1 + RCs)^2} \cdot C(s) \quad \text{Equation 6}$$

$$H_{XMB}(s) = 0$$

$$H_B(s) = \frac{1}{(1 + RCs)^2} \cdot C(s) \cdot H_T(s) \cdot H_R(s)$$

$$H_{XBM}(s) = 0.$$

It should be noted that in FIG. 29, the low output impedance buffer of the back channel transmitter in FIG. 28 is absorbed in the transmit filter. Also, it should be noted that the high input impedance buffers and the adder of the back channel receiver in FIG. 28 are absorbed in the receive filter in FIG. 29. These implementation details are directly applicable if the transmit and receive filters use operational amplifiers in active-RC filter configurations.

As the need for higher data rates over the reverse traffic back channel of a multi-media link increases, more interference and cross-talk between the main signal that carries the multi-media content and the back channel signal that carries different types of data are expected. With no special treatment, the interference may adversely affect the performance of the link and becomes an obstacle towards increasing the back channel data rate. This disclosure describes systems and methods for reducing the cross-talk in these situations and enables transmission of back channel data at much higher data rates. It is based on several components that may be separately, in any combination, or collectively added to either or both sides of the interface. These components include a back channel transmit filter, a back channel receive filter, a main channel transmit filter, a main channel receive filter, a back channel to main channel cross-talk cancellation filter, and a main channel to back channel cross-talk cancellation filter.

In addition to the inclusion of these filters to the system, some specific filter implementations based on practical and existing multi-media interfaces are presented. It should be noted that the implementation details of the filters are specific to the systems and applications and are included to describe exemplary state-of-the-art solutions for existing multi-media interfaces. Application of the invention to other and similar links that may be inferred from the invention by skilled people also constitute subject matter of the present invention and should be considered as application of the invention to similar and adjacent cases.

This written description uses examples to disclose the invention, including the best mode, and also to enable a person skilled in the art to make and use the invention. The patentable scope of the invention may include other examples that occur to those skilled in the art.

We claim:

1. An interface system for coupling a first digital device with a second digital device over a cable, comprising:
   circuitry for combining a high frequency digital content channel for transmitting digital content from the first digital device to the second digital device and a low frequency back channel for transmitting information from the second digital device to the first digital device to form a composite channel, the circuitry comprising,
      a main channel transmit filter coupled between the first digital device and the cable and configured to filter the digital content channel,
      a back channel receive filter coupled between the first digital device and the cable and configured to filter the back channel,
      a back channel transmit filter coupled between the cable and the second digital device and configured to filter the back channel,
      a main channel receive filter coupled between the cable and the second digital device and configured to filter the digital content channel, and
      at least one cross-talk cancellation filter coupled between the digital content channel and the back channel and configured to reduce cross-talk interference between the back channel and the digital content channel;
   wherein the second digital device includes a receiver having a differential pair of inputs that includes a first differential input and a second differential input, the main channel receive filter is coupled between the first differential input and the cable, and a cross-talk cancellation filter is coupled between the second differential input and the back channel.

2. The interface system of claim 1, wherein the cross-talk cancellation filter is configured to reduce cross-talk interference from the back channel to the digital content channel, the cross-talk cancellation filter being coupled between the cable and the second digital device.

3. The interface system of claim 2, wherein the cross-talk cancellation filter subtracts a cross-talk signal from the digital content channel.

4. The interface system of claim 2, wherein the cross-talk cancellation filter is matched to a cross-talk transfer function related to the back channel and the digital content channel such that the effective cross-talk between the back channel and the digital content channels is about zero.

5. The interface system of claim 1, wherein the cross-talk cancellation filter is configured to reduce cross-talk interference from the digital content channel to the back channel, the cross-talk cancellation filter being coupled between the first digital device and the cable.

6. The interface system of claim 5, wherein the cross-talk cancellation filter is matched to a cross-talk transfer function related to the back channel and the digital content channel such that the effective cross-talk between the digital content channel and the back channel is about zero.

7. The interface system of claim 5, wherein the cross-talk cancellation filter subtracts a cross-talk signal from the back channel.

8. The interface system of claim 7, wherein the subtraction of a cross-talk signal uses a complementary output of a transmitter of the first digital device.

9. The interface system of claim 7, wherein the subtraction utilizes a virtual ground of an active-resistor-capacitor (RC) filter.

10. The interface system of claim 1, further comprising a second cross-talk cancellation filter configured to reduce cross-talk interference between the back channel and the digital content channel.

11. The interface system of claim 1, wherein the back channel transmit filter is a low-pass filter.

12. The interface system of claim 1, wherein the back channel transmit filter is a pre/de-emphasis filter.

13. The interface system of claim 1, wherein the back channel transmit filter uses an active-RC configuration.

14. The interface system of claim 1, wherein the back channel receive filter is an equalizing filter.

15. The interface system of claim 1, wherein the back channel receive filter is a low-pass filter.

16. The interface system of claim 1, wherein the back channel receive filter is an out-of-band noise rejection filter.

17. The interface system of claim 1, wherein the back channel receive filter uses an active-RC configuration.

18. The interface system of claim 1, wherein the main channel transmit filter is a high-pass filter.

19. The interface system of claim 1, wherein the main channel receive filter is a high-pass filter.

20. The interface system of claim 1, wherein the cable is a coaxial cable or a twisted pair cable.

21. The interface system of claim 1, wherein the cable carries single ended or differential signals.

22. The interface system of claim 1, wherein the interface system is serial digital interface (SDI)-based system.

23. The interface system of claim 1, wherein the cross-talk cancellation filter matches a characteristic impedance of a transmission medium that includes the cable.

24. The interface system of claim 1, wherein the first digital device and the second digital device are multimedia devices.

25. The interface system of claim 1, wherein the back channel carries configuration and control data, or audio data.

26. An interface system for coupling a first digital device with a second digital device over a cable, comprising:
    circuitry for combining a high frequency digital content channel for transmitting digital content from the first digital device to the second digital device and a low frequency back channel for transmitting information from the second digital device to the first digital device to form a composite channel, the circuitry comprising,
    a main channel transmit filter coupled between the first digital device and the cable and configured to filter the digital content channel,
    a back channel receive filter coupled between the first digital device and the cable and configured to filter the back channel,
    a back channel transmit filter coupled between the cable and the second digital device and configured to filter the back channel,
    a main channel receive filter coupled between the cable and the second digital device and configured to filter the digital content channel, and
    at least one a cross-talk cancellation filter coupled between the digital content channel and the back channel and configured to reduce cross-talk interference between the back channel and the digital content channel;
    wherein the first digital device includes a transmitter having a complementary pair of outputs that includes a first differential output and a second differential output, the main channel transmit filter is coupled between the first differential output and the cable, and a cross-talk cancellation filter is coupled between the second differential output and the back channel.

27. The interface system of claim 26, wherein the cross-talk cancellation filter is configured to reduce cross-talk interference from the back channel to the digital content channel, the cross-talk cancellation filter being coupled between the cable and the second digital device.

28. The interface system of claim 27, wherein the cross-talk cancellation filter subtracts a cross-talk signal from the digital content channel.

29. The interface system of claim 27, wherein the cross-talk cancellation filter is matched to a cross-talk transfer function related to the back channel and the digital content channel such that the effective cross-talk between the back channel and the digital content channels is about zero.

30. The interface system of claim 26, wherein the cross-talk cancellation filter is configured to reduce cross-talk interference from the digital content channel to the back channel, the cross-talk cancellation filter being coupled between the first digital device and the cable.

31. The interface system of claim 30, wherein the cross-talk cancellation filter is matched to a cross-talk transfer function related to the back channel and the digital content channel such that the effective cross-talk between the digital content channel and the back channel is about zero.

32. The interface system of claim 30, wherein the cross-talk cancellation filter subtracts a cross-talk signal from the back channel.

33. The interface system of claim 32, wherein the subtraction of a cross-talk signal uses a complementary output of a transmitter of the first digital device.

34. The interface system of claim 32, wherein the subtraction utilizes a virtual ground of an active-resistor-capacitor (RC) filter.

35. The interface system of claim 26, further comprising a second cross-talk cancellation filter configured to reduce cross-talk interference between the back channel and the digital content channel.

36. The interface system of claim 26, wherein the back channel transmit filter is a low-pass filter.

37. The interface system of claim 26, wherein the back channel transmit filter is a pre/de-emphasis filter.

38. The interface system of claim 26, wherein the back channel transmit filter uses an active-RC configuration.

39. The interface system of claim 26, wherein the back channel receive filter is an equalizing filter.

40. The interface system of claim 26, wherein the back channel receive filter is a low-pass filter.

41. The interface system of claim 26, wherein the back channel receive filter is an out-of-band noise rejection filter.

42. The interface system of claim 26, wherein the back channel receive filter uses an active-RC configuration.

43. The interface system of claim 26, wherein the main channel transmit filter is a high-pass filter.

44. The interface system of claim 26, wherein the main channel receive filter is a high-pass filter.

45. The interface system of claim 26, wherein the cable is a coaxial cable or a twisted pair cable.

46. The interface system of claim 26, wherein the cable carries single ended or differential signals.

47. The interface system of claim 26, wherein the interface system is a serial digital interface (SDI)-based system.

48. The interface system of claim 26, wherein the cross-talk cancellation filter matches a characteristic impedance of a transmission medium that includes the cable.

49. The interface system of claim 26, wherein the first digital device and the second digital device are multimedia devices.

50. The interface system of claim 26, wherein the back channel carries configuration and control data, or audio data.

51. An interface system for coupling a first digital device with a second digital device over a cable, comprising:
    circuitry for combining a high frequency digital content channel for transmitting digital content from the first digital device to the second digital device and a low frequency back channel for transmitting information from the second digital device to the first digital device to form a composite signal;
    the first digital device including a transmitter having a complementary pair of outputs that includes a first differential output and a second differential output, wherein the first differential output is coupled to the high frequency digital content channel;
    the second digital device including a receiver having a differential pair of inputs that includes a first differential input and a second differential input, wherein the first differential input is coupled to the high frequency content channel;

the circuitry including one or more cross-talk cancellation filters configured to reduce cross-talk interference between the back channel and the digital content channel, wherein the one or more cross-talk cancellation filters include at least one of:

a first cross-talk cancellation filter coupled between the second differential output of the transmitter and the low frequency back channel, and a second cross-talk cancellation filter coupled between the second differential input of the receiver and the low frequency back channel.

52. The interface system of claim 51, wherein the circuitry further includes a main channel receive filter coupled between the first differential input of the receiver and the high frequency content channel.

53. The interface system of claim 51, wherein the circuitry further includes a main channel transmit filter coupled between the first differential output of the transmitter and the high frequency content channel.

54. The interface system of claim 51, wherein the circuitry further includes a back channel receive filter coupled between the first digital device and the low frequency back channel.

55. The interface system of claim 51, wherein the circuitry further includes a back channel transmit filter coupled between the second digital device and the low frequency back channel.

* * * * *